US009786394B2

(12) United States Patent
Singh et al.

(10) Patent No.: US 9,786,394 B2
(45) Date of Patent: Oct. 10, 2017

(54) COMPONENT COOLING WATER SYSTEM FOR NUCLEAR POWER PLANT

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC ( * ) Notice: Subject to any disclaimer, the term of this patent is extended or adjusted under 35 U.S.C. 154(b) by 44 days.

(21) Appl. No.: 14/423,149

(22) PCT Filed: Aug. 21, 2013

(86) PCT No.: PCT/US2013/056023
§ 371 (c)(1),
(2) Date: Feb. 23, 2015

(87) PCT Pub. No.: WO2014/031767
PCT Pub. Date: Feb. 27, 2014

(65) Prior Publication Data
US 2015/0170772 A1 Jun. 18, 2015

Related U.S. Application Data

(63) Continuation-in-part of application No. PCT/US2013/042070, filed on May 21, 2013.
(Continued)

(51) Int. Cl.
G21C 15/18 (2006.01)
G21C 15/12 (2006.01)
(Continued)

(52) U.S. Cl.
CPC ............. G21C 15/18 (2013.01); G21C 9/012 (2013.01); G21C 11/02 (2013.01); G21C 11/088 (2013.01);
(Continued)

(58) Field of Classification Search
CPC ........ G21C 15/18; G21C 1/322; G21C 1/086; G21C 13/00; G21C 15/00; G21C 9/00;
(Continued)

(56) References Cited

U.S. PATENT DOCUMENTS 3,621,926 A   11/1971   Townsend
3,718,539 A * 2/1973   West .................. G21C 9/00
                                                376/283
(Continued)

FOREIGN PATENT DOCUMENTS

WO    2010136108    12/2010

OTHER PUBLICATIONS

Basco U-Tube & Tank Immersion Heat Exchangers, API Heat Transfer, 2001.*
(Continued)

Primary Examiner — Jack W Keith
Assistant Examiner — Sharon M Davis
(74) Attorney, Agent, or Firm — The Belles Group, P.C.

(57) ABSTRACT

A component cooling water system for a nuclear power plant. In one embodiment, the system includes an inner containment vessel housing a nuclear reactor and an outer containment enclosure structure. An annular water reservoir is formed between the containment vessel and containment enclosure structure which provides a heat sink for dissipating thermal energy. A shell-less heat exchanger is provided having an exposed tube bundle immersed in water held within the annular water reservoir. Component cooling water from the plant flows through the tube bundle and is cooled by transferring heat to the annular water reservoir. In one non-limiting embodiment, the tube bundle may be U-shaped.

26 Claims, 20 Drawing Sheets

Related U.S. Application Data

(60) Provisional application No. 61/691,533, filed on Aug. 21, 2012, provisional application No. 61/649,593, filed on May 21, 2012.

(51) Int. Cl.

| | |
|---|---|
| *G21C 15/26* | (2006.01) |
| *G21C 11/08* | (2006.01) |
| *G21D 1/04* | (2006.01) |
| *G21C 9/012* | (2006.01) |
| *G21C 11/02* | (2006.01) |
| *G21C 13/02* | (2006.01) |
| *G21C 19/07* | (2006.01) |

(52) U.S. Cl.
CPC ............. *G21C 13/02* (2013.01); *G21C 15/12* (2013.01); *G21C 15/26* (2013.01); *G21D 1/04* (2013.01); *G21C 19/07* (2013.01); *Y02E 30/40* (2013.01)

(58) Field of Classification Search
CPC .... G21C 11/022; G21C 13/036; G21C 15/22; G21C 15/182; G21D 1/006; G21D 1/00; G21D 3/04; G21D 1/02; G21D 1/04; F28D 7/1669; F28D 1/02; F28D 1/0206; F28D 1/0475; F28D 1/0341; F28D 1/035
USPC ....... 376/299, 298, 283, 405, 282, 277, 293, 376/361, 287, 292, 403, 406, 443, 448; 976/DIG. 196, DIG. 39, DIG. 187, 976/DIG. 139, DIG. 154, DIG. 8, 1; 165/172, 81, DIG. 407, 157, 163
See application file for complete search history.

(56) References Cited

U.S. PATENT DOCUMENTS

| | | | | |
|---|---|---|---|---|
| 4,033,814 A | * | 7/1977 | Bregeon ................. | G21C 1/14 376/298 |
| 4,080,256 A | * | 3/1978 | Braun ..................... | G21C 13/00 376/282 |
| 4,239,596 A | * | 12/1980 | Bevilacqua ............ | G21C 15/18 376/282 |
| 4,478,784 A | * | 10/1984 | Burelbach ............... | G21C 1/03 165/274 |
| 4,508,677 A | * | 4/1985 | Craig ..................... | G21C 1/322 376/171 |
| 4,678,626 A | * | 7/1987 | Germer .................. | G21C 15/18 376/293 |
| 4,696,791 A | * | 9/1987 | Straub .................... | G21C 1/322 376/282 |
| 4,753,771 A | * | 6/1988 | Conway ................. | G21C 15/18 376/282 |
| 4,767,594 A | * | 8/1988 | Hunsbedt ................ | F28D 20/02 376/282 |
| 4,950,448 A | * | 8/1990 | Gou ....................... | G21C 15/18 376/283 |
| 5,043,135 A | * | 8/1991 | Hunsbedt ............... | G21C 15/12 376/299 |
| 5,053,190 A | * | 10/1991 | Gardner ................... | G21C 1/09 376/307 |
| 5,076,999 A | * | 12/1991 | Forsberg ................ | G21C 15/18 376/282 |
| 5,089,218 A | * | 2/1992 | Gardner ................... | G21C 1/09 376/283 |
| 5,091,143 A | * | 2/1992 | Tate ....................... | G21C 1/084 376/282 |
| 5,102,616 A | * | 4/1992 | Gardner ................. | G21C 1/322 376/282 |
| 5,158,741 A | * | 10/1992 | Boardman ............. | G21C 15/18 376/299 |
| 5,282,230 A | * | 1/1994 | Billig ..................... | G21C 9/004 376/283 |
| 5,349,616 A | * | 9/1994 | Nakayama ............. | G21C 15/18 376/282 |
| 5,398,267 A | * | 3/1995 | Reinsch .................. | G21C 9/012 376/298 |
| 5,442,668 A | * | 8/1995 | Todreas .................. | G21C 1/10 376/367 |
| 2003/0010481 A1 | | 1/2003 | Northrop | |
| 2007/0076835 A1 | * | 4/2007 | Tobimatsu ............. | G21C 9/004 376/280 |
| 2009/0129530 A1 | * | 5/2009 | Reyes, Jr. ............... | G21C 1/32 376/282 |
| 2009/0129531 A1 | * | 5/2009 | Reyes, Jr. .............. | G21C 9/012 376/299 |
| 2011/0314858 A1 | * | 12/2011 | Tahara ................... | G21C 9/004 62/259.1 |

OTHER PUBLICATIONS

Shell and tube heat exchanger, Wikipedia, 2010.*
Component and Closed Cooling Water Systems, Nuclear Tourist, 2006.*
Corresponding International Search Report and Written Opinion for PCT/US2013/056023 dated Feb. 10, 2014.

* cited by examiner

COMPONENT COOLING WATER SYSTEM FOR NUCLEAR POWER PLANT

CROSS-REFERENCE TO RELATED PATENT APPLICATIONS

The present application is a U.S. national stage application under 35 U.S.C. §371 of PCT/US2013/056023 filed Aug. 21, 2013, which claims the benefit of U.S. Provisional Patent Application Ser. No. 61/691,533 filed Aug. 21, 2012, and is a continuation-in-part of PCT International Patent Application Serial No. PCT/US13/42070 filed May 21, 2013, which claims the benefit of U.S. Provisional Patent Application Ser. No. 61/649,593 filed May 21, 2012; the entireties of which are all incorporated herein by reference.

FIELD OF THE INVENTION

The present invention relates nuclear reactors, and more particularly to a reactor containment system with passive, thermal energy release control.

BACKGROUND OF THE INVENTION

The containment for a nuclear reactor is defined as the enclosure that provides environmental isolation to the nuclear steam supply system (NSSS) of the plant in which nuclear fission is harnessed to produce pressurized steam. A commercial nuclear reactor is required to be enclosed in a pressure retaining structure which can withstand the temperature and pressure resulting from the most severe accident that can be postulated for the facility. The most severe energy release accidents that can be postulated for a reactor and its containment can be of two types.

First, an event that follows a loss-of-coolant accident (LOCA) and involve a rapid large release of thermal energy from the plant's nuclear steam supply system (NSSS) due to a sudden release of reactor's coolant in the containment space. The reactor coolant, suddenly depressurized, would violently flash resulting in a rapid rise of pressure and temperature in the containment space. The in-containment space is rendered into a mixture of air naiad steam. LOCA can be credibly postulated by assuming a sudden failure in a pipe carrying the reactor coolant.

Another second thermal event of potential risk to the integrity of the containment is the scenario wherein all heat rejection paths from the plant's nuclear steam supply system (NSSS) are lost, forcing the reactor into a "scram." A station black-out is such an event. The decay heat generated in the reactor must be removed to protect it from an uncontrolled pressure rise.

More recently, the containment structure has also been called upon by the regulators to withstand the impact from a crashing aircraft. Containment structures have typically been built as massive reinforced concrete domes to withstand the internal pressure from LOCA. Although its thick concrete wall could be capable of withstanding an aircraft impact, it is also a good insulator of heat, requiring pumped heat rejection systems (employ beat exchangers and pumps) to reject its unwanted heat to the external environment (to minimize the pressure rise or to remove decay heat). Such heat rejection systems, however, rely on a robust power source (off-site or local diesel generator, for example) to power the pumps. The station black out at Fukushima in the wake of the tsunami is a sobering reminder of the folly of relying on pumps.

Present day containment structures with their monolithic reinforced concrete construction make it extremely difficult and expensive to remove and install a large capital requirement such as a steam generator in the NSSS enclosed by them. To make a major equipment change out, a hatch opening in the thick concrete dome has to be made at great expense and down time for the reactor. Unfortunately, far too many steam generators have had to be changed out at numerous reactors in the past 25 years by cutting through the containment dome at billions of dollars in cost to the nuclear power industry.

In a nuclear plant, the component cooling water (CCW) system is a closed loop of purified water that serves to cool a variety of equipment in the plant. Among its important auxiliary roles is extracting the decay heat from the reactor water after the reactor is shutdown, which is typically performed inside a tubular heat exchanger known variously as the "decay heat cooler" or "residual heat removal beat exchanger." The heat transferred to component cooling water in the decay heat cooler and other heat exchangers that are used to cool electrical and mechanical machinery occurs across the walls of tubes which sequesters or isolates the component cooling water from the radioactive contamination that may be associated with the reactor water. Thus, the component cooling system essentially serves to provide the means to remove waste heat from all equipment in the plant that requires cooling as well as to serve as a barrier against release of radiation to the environment.

The heat collected by the component cooling water from plant equipment, however, raises its temperature. The heated component cooling water is typically cooled in a once-through flow system by rejecting its heat to the environment in a shell-and-tube heat exchanger using a natural body of water such a lake, river, or sea. The component cooling water system draws cool raw writer from the natural body of water, which is pumped through the component cooling water heat exchanger and then returns the now heated water back to the natural body of water. Such a CCW system, however, suffers from several operational problems such as intrusion of debris carried over by the raw cooling water, biological fouling of heat exchanger tubes by raw water, and corrosion of pipes carrying the raw water into the heat exchanger. Operating nuclear plants often report significant accumulation of sediments and other foulants in the headers of CCW heat exchangers requiring frequent maintenance and degrading thermal performance.

The above weaknesses in the state-of-the-art call for an improved nuclear reactor containment system and component cooling water system.

SUMMARY OF THE INVENTION

The present invention according to one aspect provides a component cooling water system that overcomes the deficiencies of the foregoing system.

In one embodiment, a component cooling water system for as nuclear power plant includes a containment vessel defining containment space configured for housing a nuclear reactor, a containment enclosure structure surrounding the containment vessel, an annular water reservoir formed between the containment vessel and containment enclosure structure, the annular water reservoir configured to provide a heat sink for dissipating thermal energy, and a shell-less heat exchanger having an exposed heat transfer tube bundle immersed in water held within the annular water reservoir. Component cooling water from the plant flows through the tube bundle and is cooled by transferring heat to the annular water reservoir. The tube bundle is comprised of a plurality of heat transfer tubes. In one embodiment, the tube bundle is U-shaped.

In another embodiment, a component cooling water system for a nuclear power plant includes a containment vessel defining containment space configured for housing a nuclear reactor, a containment enclosure structure surrounding the containment vessel, an annular water reservoir formed between the containment vessel and containment enclosure structure, the annular water reservoir configured to provide a heat sink for dissipating thermal energy, a shell-less heat exchanger having, an exposed heat transfer tube bundle comprised of a plurality of tubes immersed in water held within the annular water reservoir, and a discharge sparger positioned below the exposed tube bundle in the annular water reservoir. The sparger is configured and arranged to discharge water recirculated from the annular water reservoir through the tube bundle for cooling the tubes. Component cooling water from the plant flows through the tubes of the tube bundle and is cooled by transferring heat to the annular water reservoir.

According to another embodiment, a component cooling water system for a nuclear power plant includes a containment vessel defining containment, space housing a nuclear reactor, a containment enclosure structure surrounding the containment vessel, an annular water reservoir formed between the containment vessel and containment enclosure structure, the annular water reservoir configured to provide a heat sink for dissipating thermal energy, a shell-less heat exchanger having an exposed heat transfer tube bundle comprised of a plurality of tubes immersed in water held within the annular water reservoir, and a plurality of substantially radial fins protruding outwards from the containment vessel towards the containment enclosure structure and located in the annular water reservoir. In this embodiment, the heat exchanger is located in a circumferentially-extending bay formed in the annular water reservoir between a pair of spaced apart adjacent fins. Component cooling water from the plant flows through the tubes of the tube bundle and is cooled by transferring heat to the annular water reservoir.

The present invention according to another aspect provides nuclear reactor containment system that overcomes the deficiencies of the foregoing containment system arrangements. The containment system generally includes an inner containment vessel which may be formed of steel or another ductile material and an outer containment enclosure structure (CES) thereby forming a double walled containment system. In one embodiment, a water-filled annulus may be provided between the containment vessel and the containment enclosure structure providing an annular cooling reservoir. The containment vessel may include a plurality of longitudinal heat transfer fins which extend (substantially) radial outwards from the vessel in the manner of "fin". The containment vessel thus serves not only as the primary structural containment for the reactor, but is configured and operable to function as a heat exchanger with the annular water reservoir acting as the heat sink. Accordingly, as further described herein, the containment vessel advantageously provides a passive (i.e. non-pumped) heat rejection system when needed during a thermal energy release accident such as a LOCA or reactor scram to dissipate heat and cool the reactor.

The present invention further provides a component cooling water system which overcomes the deficiencies of the foregoing, cooling water system arrangements. As further described herein, the component cooling water system includes a heat exchanger which may be arranged and incorporated into the water-filled annulus (i.e. annular water reservoir). The water in the annulus may therefore serve as an active heat transfer medium which rejects heat from the cooling system via evaporation rather than utilizing a natural body of water.

In one embodiment according to the present disclosure, a nuclear reactor containment system includes a containment vessel configured for housing a nuclear reactor, a containment enclosure structure (CES) surrounding the containment vessel, and an annular reservoir formed between the containment vessel and containment enclosure structure (CES) for extracting heat enemy from the containment space. In the event of a thermal energy release incident inside the containment vessel, heat generated by the containment vessel is transferred, to the annular reservoir which operates to cool the containment vessel. In one embodiment, the annular reservoir contains water for cooling the containment vessel. A portion of the containment vessel may include substantially radial heat transfer fins disposed in the annular reservoir and extending between the containment vessel and containment enclosure structure (CES) to improve the dissipation of heat to the water-filled annular reservoir. When a thermal energy release incident occurs inside the containment vessel, a portion of the water in the annulus is evaporated and vented to atmosphere through the containment enclosure structure (CES) annular reservoir in the form of water vapor.

Embodiments of the system may further include an auxiliary air cooling system including a plurality of vertical inlet air conduits spaced circumferentially around the containment vessel in the annular reservoir. The air conduits are in fluid communication with the annular reservoir and outside ambient air external to the containment enclosure structure (CES). When a thermal energy release incident occurs inside the containment vessel and water in the annular reservoir is substantially depleted by evaporation, the air cooling system becomes operable by providing a ventilation path from the reservoir space to the external ambient. The ventilation system can thus be viewed as a secondary system that can continue to cool the containment ad infinitum.

According to another embodiment, a nuclear reactor containment system includes a containment vessel configured for housing a nuclear reactor, a containment enclosure structure (CES) surrounding the containment vessel, a water filled annulus formed between the containment vessel and containment enclosure structure (CES) for cooling the containment vessel, and a plurality of substantially radial fins protruding, outwards from the containment vessel and located in the annulus. In the event of a thermal enemy release incident inside the containment vessel, heat generated by the containment vessel is transferred to the water filled reservoir in the annulus through direct contact with the external surface of the containment vessel and its fins substantially radial thus cooling the containment vessel. In one embodiment, when a thermal energy release incident occurs inside the containment vessel, and water in the annulus is substantially depleted by evaporation, the air cooling system is operable to draw outside ambient air into the annulus through the air conduits to cool the heat generated in the containment (which decreases exponentially with time by natural convection. The existence of water in the annular region completely surrounding the containment vessel will maintain a consistent temperature distribution in the containment vessel to prevent warping of the containment vessel during the thermal energy release incident or accident.

In another embodiment, a nuclear reactor containment system includes a containment vessel including a cylindrical shell configured for housing a nuclear reactor, a containment enclosure structure (CES) surrounding the containment vessel, an annular reservoir containing water formed between the shell of the containment vessel and containment enclosure structure (CES) for cooling the containment vessel, a plurality of external (substantially) radial fins protruding outwards from the containment vessel into the annulus, and an air cooling system including a plurality of vertical inlet air conduits spaced circumferentially around the containment vessel in the annular reservoir. The air conduits are in fluid communication with the annular reservoir and outside ambient air external to the containment enclosure structure (CES). In the event of a thermal energy release incident inside the containment vessel, heat generated by the containment vessel is transferred to the annular reservoir via the (substantially) radial containment wall along with its internal and external fins which operates to cool the containment vessel.

Advantages and aspects of a nuclear reactor containment system according to the present disclosure include the following:

Containment structures and systems configured so that a severe energy release event as described above can be contained passively (e.g. without relying on active components such as pumps, valves, heat exchangers and motors);

Containment structures and systems that continue to work autonomously for an unlimited duration (e.g. no time limit for human intervention);

Containment structures fortified with internal and external ribs (fins) configured to withstand a projectile impact such as a crashing aircraft without losing its primary function (i.e. pressure & radionuclide (if any) retention and heat rejection); and Containment vessel equipped with provisions that allow for the ready removal (or installation) of major equipment through the containment structure.

BRIEF DESCRIPTION OF THE DRAWINGS

The features of the illustrative embodiments of the present invention will be described with reference to the following drawings, where like elements are labeled similarly, and in which.

Figure 1:
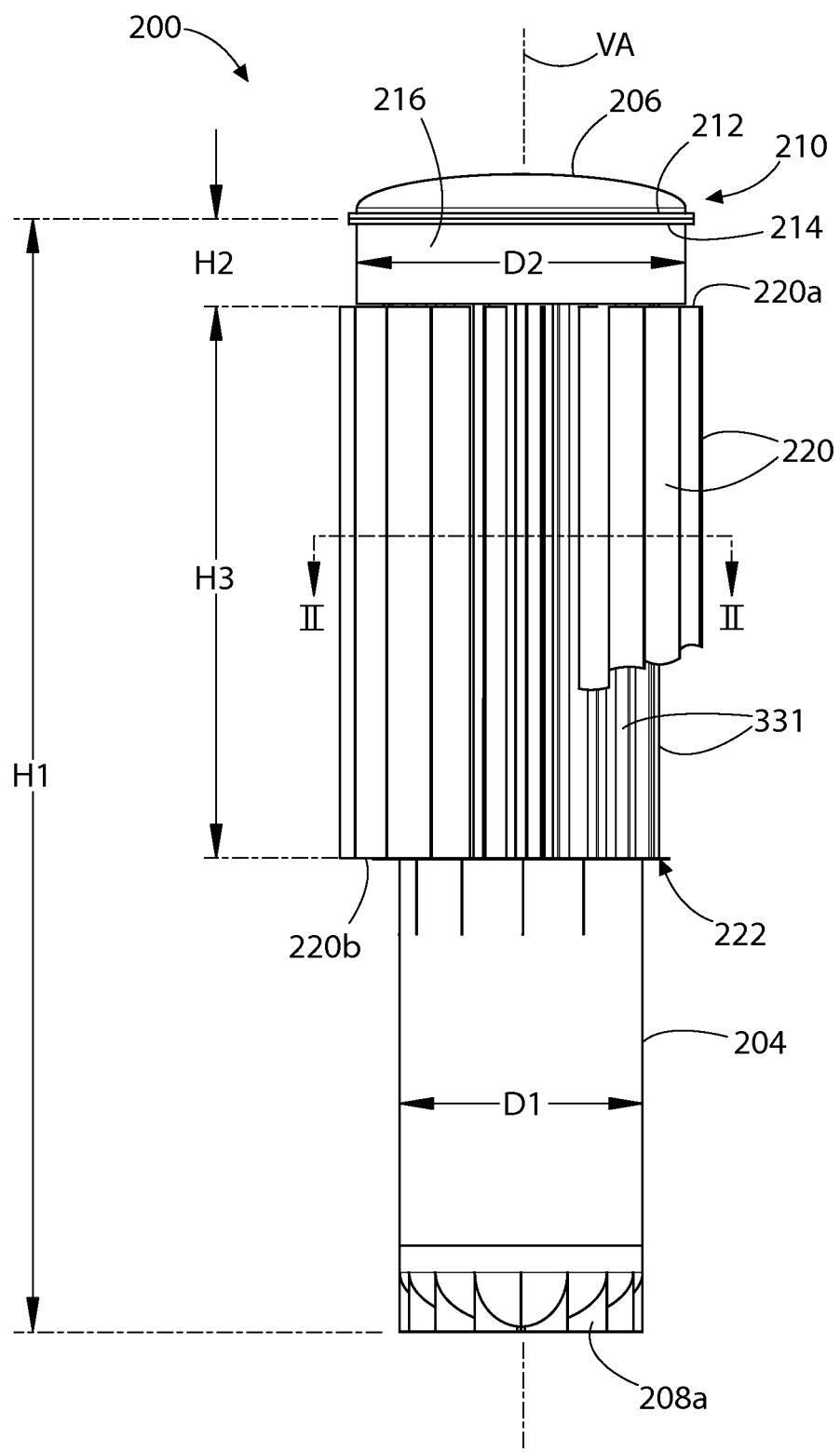
FIG. 1 is side elevation view of a finned primary reactor containment vessel according to the present disclosure which forms part of a unclear reactor containment system, the lower portions of some fins being broken away in part to reveal vertical support columns and circumferential rib.

All drawings are schematic and not necessarily to scale.

DETAILED DESCRIPTION OF THE EMBODIMENTS

The features and benefits of the invention are illustrated and described herein by reference to illustrative embodiments. This description of illustrative embodiments is intended to be read in connection with the accompanying drawings, which are to be considered pan of the entire written description. In the description of embodiments disclosed herein, any reference to direction or orientation is merely intended for convenience of description and is not intended in any way to limit, the scope of the present invention. Relative terms such as "lower," "upper," "horizontal," "vertical," "above," "below," "up," "down," "top"

and "bottom" as well as derivative thereof (e.g., "horizontally," "downwardly," "upwardly" etc.) should be construed to refer to the nominal orientation as then described or as shown in the drawing under discussion. These relative terms are for convenience of description only and do not require that the apparatus be constructed or operated in a rigorously specific orientation denoted by the term. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such illustrative embodiments illustrating some possible non-limiting combination of features that may exist alone or in other combinations of features.

Referring to FIGS. 1-15, a nuclear reactor containment system 100 according to the present disclosure is shown. The system 100 generally includes an inner containment structure such as containment vessel 200 and an outer containment enclosure structure (CES) 300 collectively defining a containment vessel-enclosure assembly 200-300. The containment vessel 200 and containment enclosure structure (CES) 300 are vertically elongated and oriented, and defines a vertical axis VA.

Figure 6:
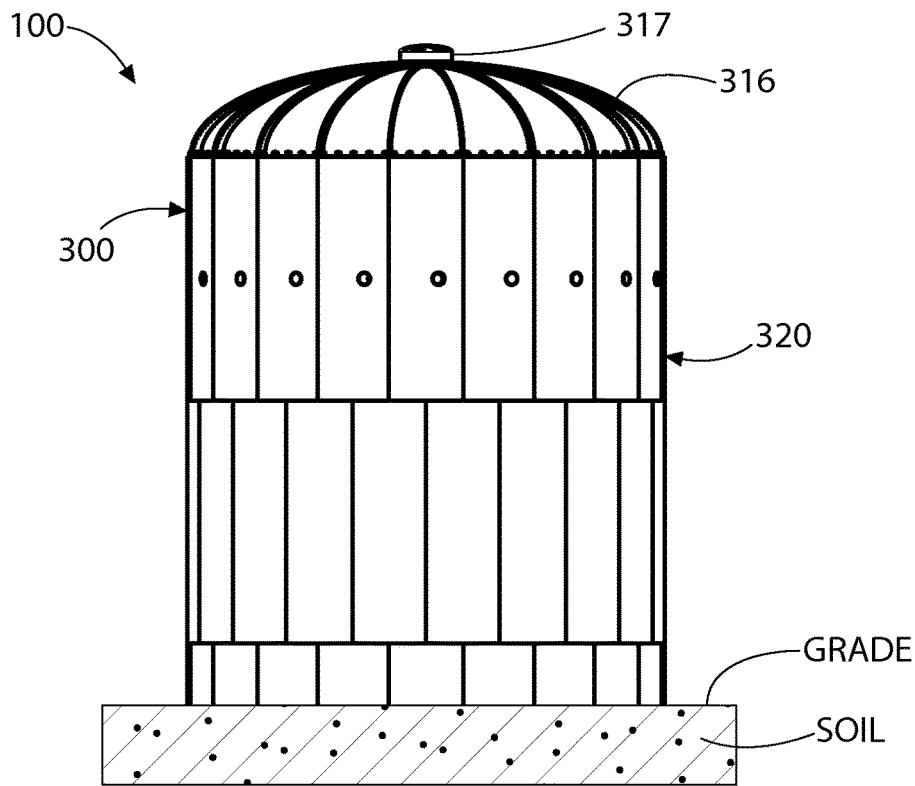
FIG. 6 is a side elevation view of nuclear reactor containment system as installed with the outer containment enclosure structure (CES) being visible above grade.
Figure 7:
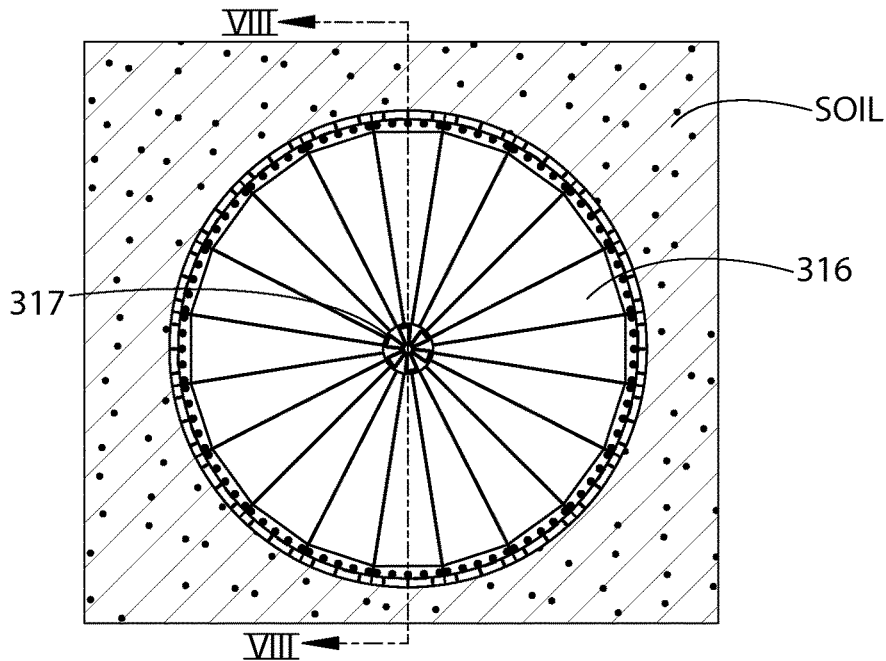
FIG. 7 is a top plan view thereof.
Figure 8:
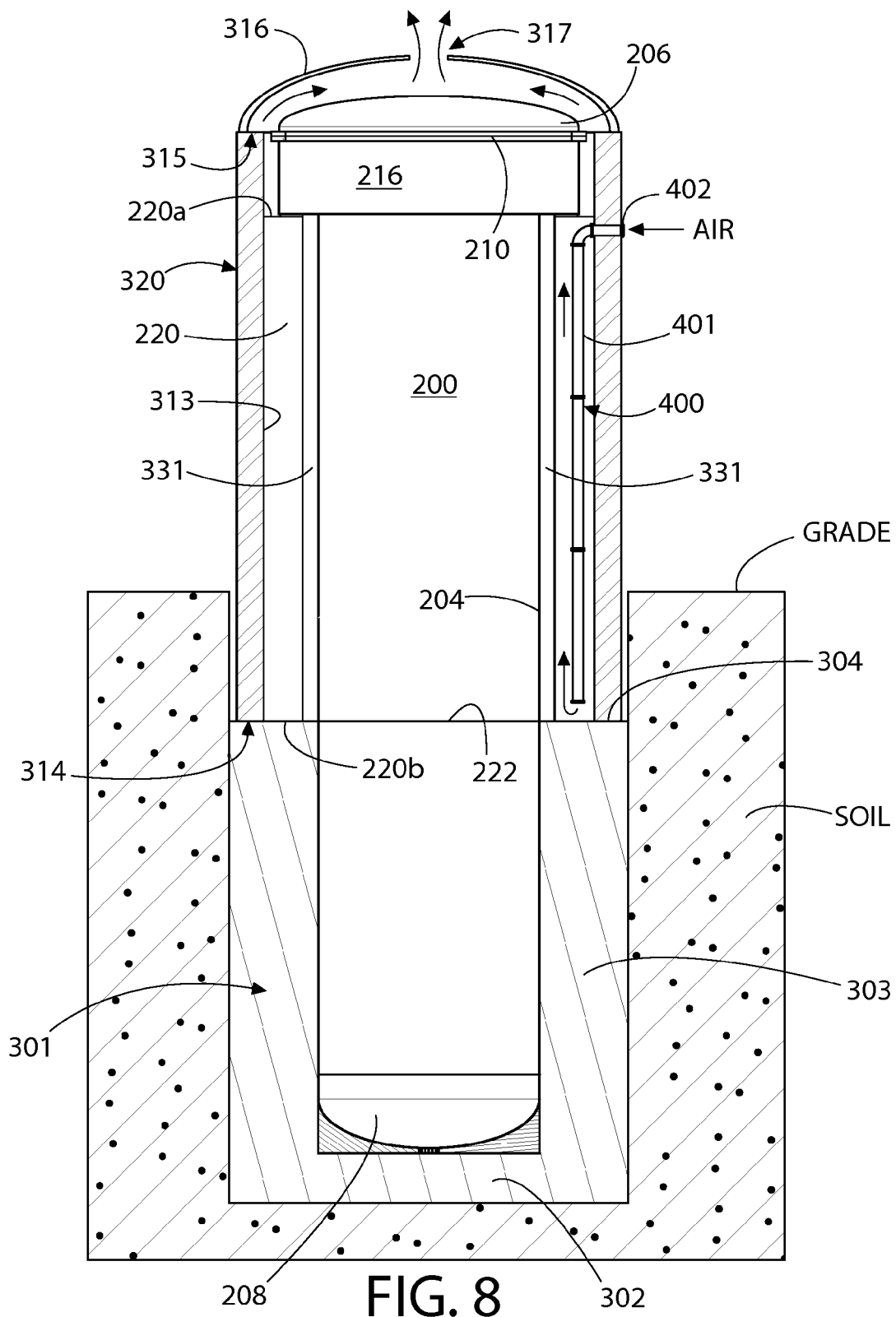
FIG. 8 is longitudinal cross-sectional view thereof taken along line VIII-VIII in FIG. 7 showing both above and below grade portions of the nuclear reactor containment system.
Figure 9:
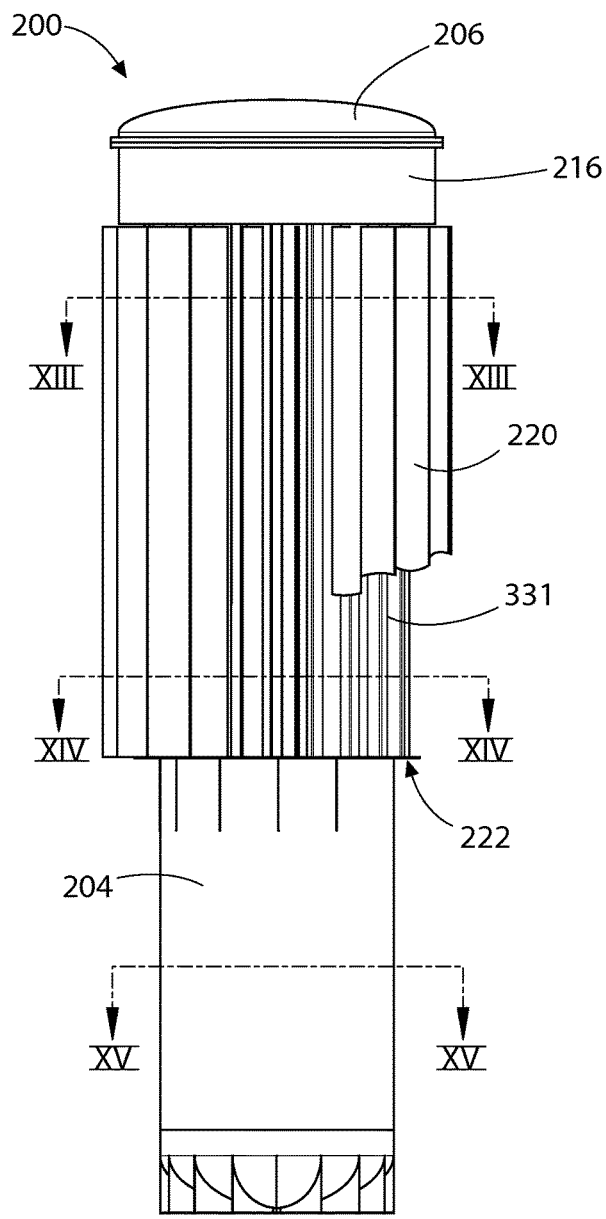
FIG. 9 is side elevation view of the primary reactor containment vessel showing various cross-section cuts to reveal equipment housed in and additional details of the containment vessel.
Figure 10:
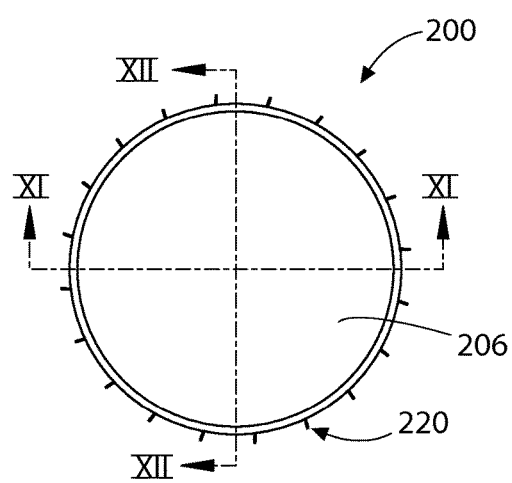
FIG. 10 is a top plan view thereof.
Figure 11:
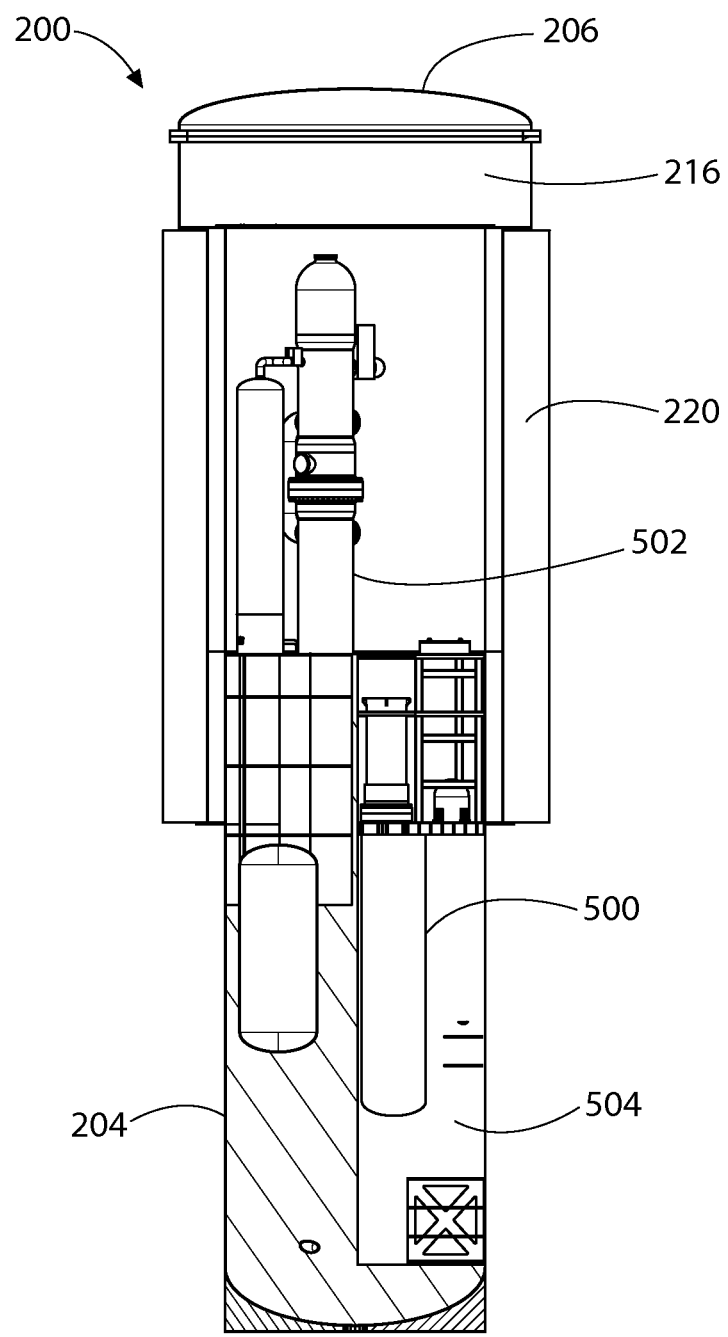
FIG. 11 is a longitudinal cross-sectional view thereof taken along line XI-XI in FIG. 10.
Figure 12:
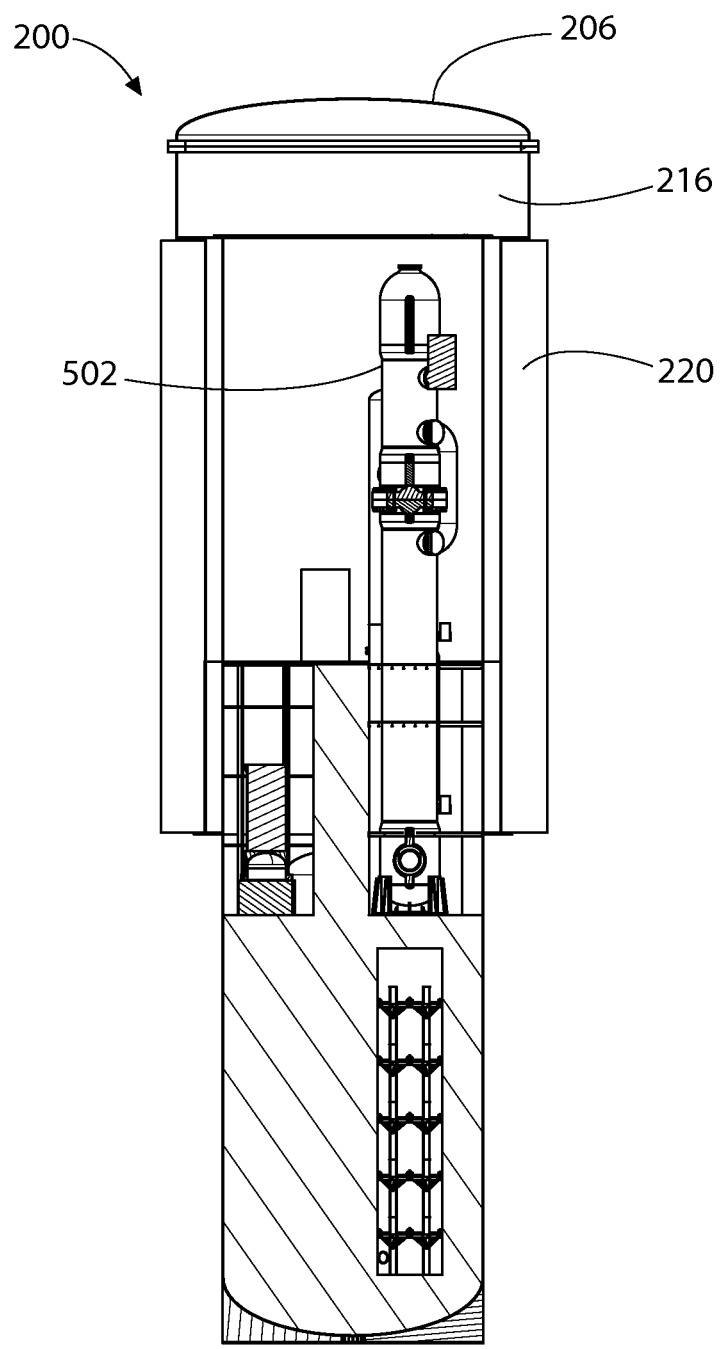
FIG. 12 is a longitudinal cross-sectional view thereof taken along line XII-XII in FIG. 10.
Figure 13:
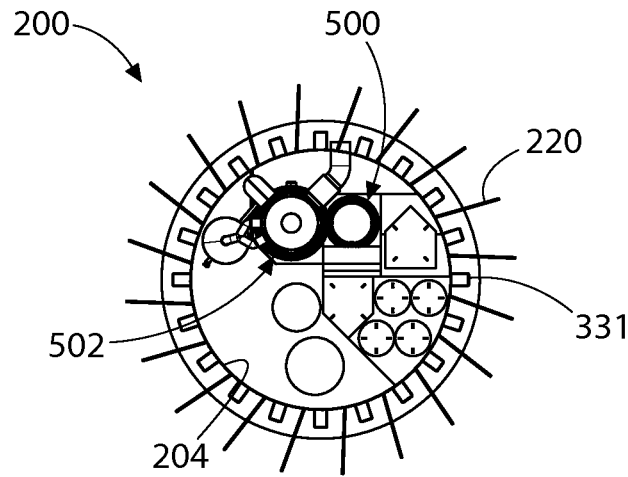
FIG. 13 is a transverse cross-sectional view thereof taken along line XIII-XIII in FIG. 9.
Figure 14:
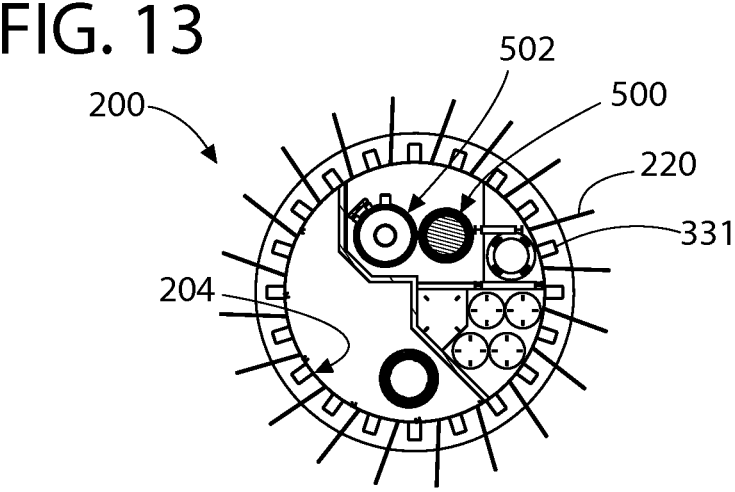
FIG. 14 is a transverse cross-sectional view thereof taken along line XIV-XIV in FIG. 9.
Figure 15:
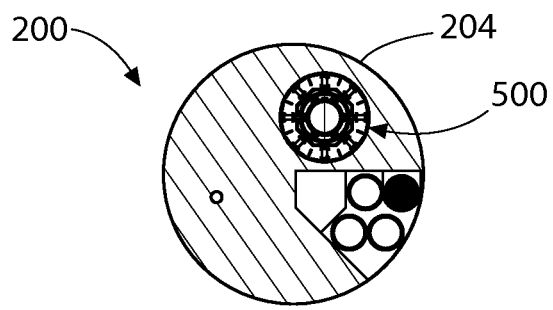
FIG. 15 is a transverse cross-sectional view thereof taken along line XV-XV in FIG. 9.

In one embodiment, the containment vessel-enclosure assembly 200-300 is configured to be buried in the subgrade at least partially below grade (see also FIGS. 6-8). The containment vessel-enclosure assembly 200-300 may be supported by a concrete foundation 301 comprised of a bottom slab 302 and vertically extending sidewalls 303 rising from the slab forming a top base mat 304. The sidewalls 303 may circumferentially enclose containment vessel 200 as shown wherein a lower portion of the containment vessel may be positioned inside the sidewalls. In some embodiments, the sidewalk 303 may be poured after placement of the containment vessel 200 on the bottom slab 302 (which may be poured and set first) thereby completely embedding the lower portion of the containment vessel 200 within the foundation. The foundation walls 303 may terminate below grade in some embodiments as shown to provide additional protection for the containment vessel-enclosure assembly 200-300 from projectile impacts (e.g. crashing plane, etc.). The foundation 301 may have any suitable configuration in top plan view, including without limitation polygonal (e.g. rectangular, hexagon, circular, etc.).

In one embodiment, the weight of the containment vessel 200 may be primarily supported by the bottom slab 302 on which the containment vessel rests and the containment enclosure structure (CES) 300 may be supported by the base mat 304 formed atop the sidewalk 303 of the foundation 301. Other suitable vessel and containment enclosure structure (CES) support arrangements may be used.

With continuing reference to FIGS. 1-15, the containment structure 200 may be an elongated vessel 202 including; a hollow cylindrical shell 204 with circular transverse cross-section defining an outer diameter D1, a top head 206, and a bottom head 208. In one embodiment, the containment vessel 200 (i.e. shell and heads) may be made from a suitably strong and ductile metallic plate and bar stock that is readily weldable (e.g. low carbon steel). In one embodiment, a low carbon steel shell 204 may have a thickness of at least 1 inch. Other suitable metallic materials including various alloys may be used.

The top head 206 may be attached to the shell 204 via a flanged joint 210 comprised of a first annular flange 212 disposed on the lower end or bottom of the top head and a second mating annular flange 214 disposed on the upper end or top of the shell. The flanged joint 210 may be a bolted joint, which optionally may further be seal welded after assembly with a circumferentially extending annular seal weld being made between the adjoining flanges 212 and 214.

The top head 206 of containment vessel 200 may be an ASME (American Society of Mechanical Engineers) dome-shaped flanged and dished head to add structural strength (i.e. internal pressure retention and external impact resistance); however, other possible configurations including a flat top head might be used. The bottom head 208 may similarly be a dome-shaped dished head or alternatively flat in other possible embodiments. In one containment vessel construction, the bottom head 208 may be directly welded to the lower portion or end of the shell 204 via an integral straight flange (SF) portion of the head matching the diameter of shell. In one embodiment, the bottom of the containment vessel 200 may include a ribbed support stand 208a or similar structure attached to the bottom head 208 to help stabilize and provide level support for the containment vessel on the slab 302 of the foundation 301, as further described herein.

In some embodiments, the top portion 216 of the containment vessel shell 204 may be a diametrically enlarged segment of the shell that forms a housing to support and accommodate a polar crane (not shown) for moving equipment, fuel, etc. inside the containment vessel. This will provide crane access to the very inside periphery of the containment vessel and enable placement of equipment very close to the periphery of the containment vessel 200 making the containment vessel structure compact. In one configuration, therefore, the above grade portion of the containment vessel 200 may resemble a mushroom-shaped structure.

In one possible embodiment, the enlarged top portion 216 of containment vessel 200 may have an outer diameter D2 that is larger than the outer diameter D1 of the rest of the adjoining lower portion 218 of the containment vessel shell 204. In one non-limiting example, the top portion 216 may have a diameter D2 that is approximately 10 feet larger than the diameter D1 of the lower portion 218 of the shell 204. The top portion 216 of shell 204 may have a suitable height 112 selected to accommodate the polar crane with allowance for working clearances which may be less than 50% of the total height H1 of the containment vessel 200. In one non-limiting example, approximately the top ten feet of the containment vessel 200 (H2) may be formed by the enlarged diameter top portion 216 in comparison to a total height H1 of 200 feet of the containment vessel. The top portion 216 of containment vessel 200 may terminate at the upper end with flange 214 at the flanged connection to the top head 206 of the containment vessel.

Figure 4:
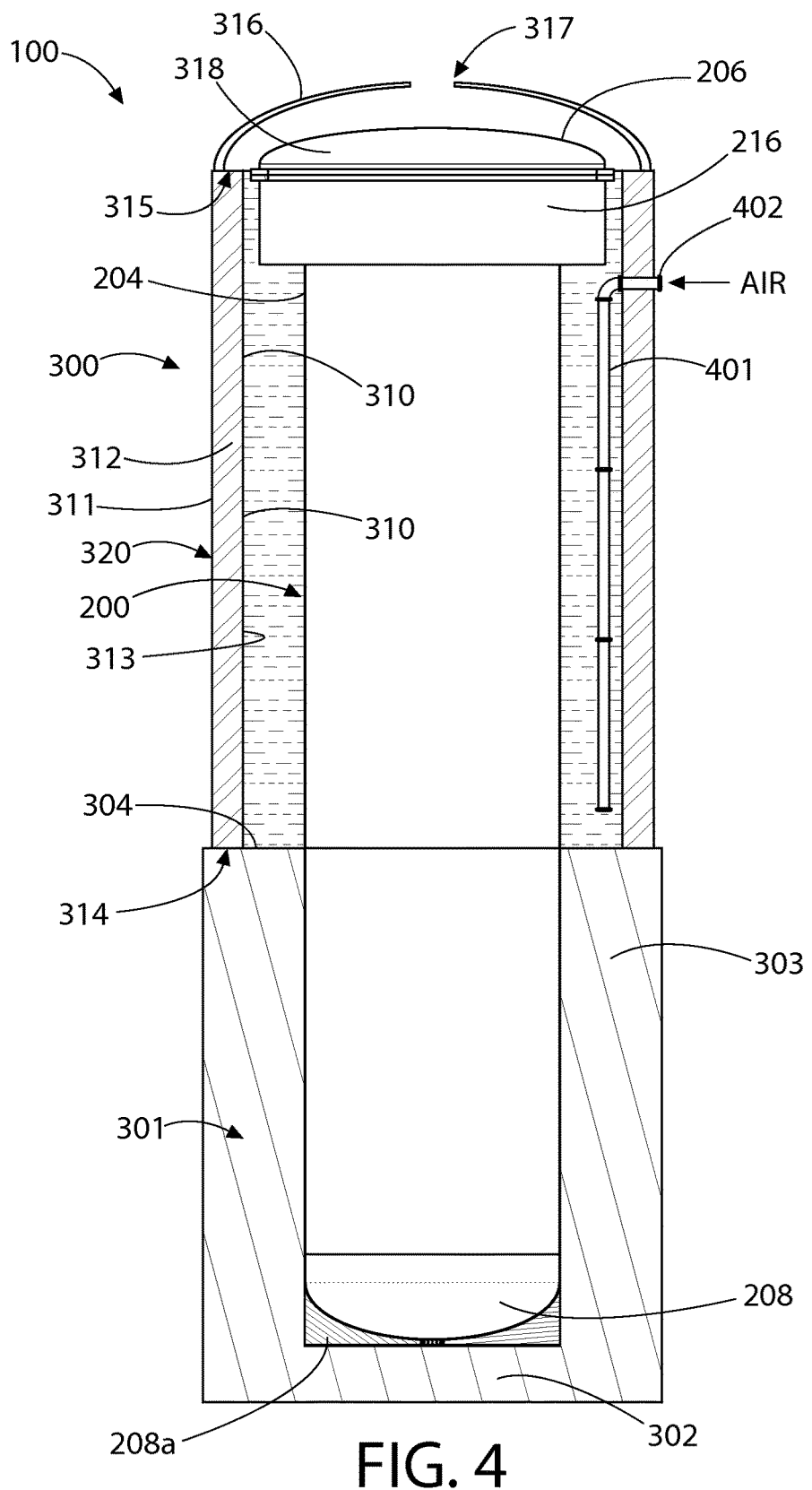
FIG. 4 is a longitudinal cross-sectional view of the nuclear reactor containment system showing the containment vessel of FIG. 1 and outer containment enclosure structure (CES) with water filled annular reservoir formed between the vessel and enclosure.

In one embodiment, the diametrically enlarged top portion 216 of containment vessel 200 has a diameter D2 which is smaller than the inside diameter D3 of the containment enclosure structure (CES) 300 to provide a (substantially) radial gap or secondary annulus 330 (see, e.g. FIG. 4). This provides a cushion of space or buffer region between the containment enclosure structure (CES) 300 and containment vessel top portion 216 in the advent of a projectile impact on the containment enclosure structure (CES). Furthermore, the annulus 330 further significantly creates a flow path between primary annulus 313 (between the shells of the containment enclosure structure (CES) 300 and containment vessel 200) and the head space 318 between the containment enclosure structure (CES) dome 316 and top head 206 of the containment vessel 200 for steam and/or air to be vented from the containment enclosure structure (CES) as further described herein. Accordingly, the secondary annulus 330 is in fluid communication with the primary annulus 313 and the head space 318 which in turn is in fluid communication with vent 317 which penetrates the dome 316. In one embodiment, the secondary annulus 330 has a smaller (substantially) radial width than the primary annulus 313.

Referring to FIGS. 1-4, the containment enclosure structure (CBS) structure (CES) 300 may be double-walled structure in some embodiments having sidewalls 320 formed by two (substantially) radially spaced and interconnected concentric shells 310 (inner) and 311 (outer) with plain or reinforced concrete 312 installed in the annular space between them. The concentric shells 310, 311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure structure (CBS) 300 may have a concrete 312 thickness of 6 feet or more which ensures adequate ability to withstand high energy projectile impacts such as that from an airliner.

The containment enclosure structure (CES) 300 circumscribes the containment vessel shell 204 and is spaced (substantially) radially apart from shell 204, thereby creating primary annulus 313. Annulus 313 may be a water-filled in one embodiment (i.e. annular water reservoir) to create a heat sink for receiving and dissipating heat from the containment vessel 200 in the case of a thermal energy release incident inside the containment vessel. This water-filled annular reservoir preferably extends circumferentially for a full 360 degrees in one embodiment around the perimeter of upper portions of the containment vessel Shell 204 lying above the concrete foundation 301. FIG. 4 shows a cross-section of the water-filled annulus 313 without the external (substantially) radial fins 221 in this figure for clarity. In one embodiment, the annulus 313 is filled with water from the base mat 304 at the bottom end 314 to approximately the top end 315 of the concentric shells 310, 311 of the containment enclosure structure (CES) 300 to form an annular cooling water reservoir between the containment vessel shell 204 and inner shell 310 of the containment enclosure structure (CES). This annular reservoir may be coated or lined in some embodiments with a suitable corrosion resistant material such as aluminum, stainless steel, or a suitable preservative for corrosion protection, in one representative example, without limitation, the annulus 313 may be about 10 feet wide and about 100 feet high.

In one embodiment, the containment enclosure structure (CES) 300 includes a steel dome 316 that is suitably thick and reinforced to harden it against crashing aircraft and other incident projectiles. The dome 316 may be removably fastened to the shells 310, 311 by a robust flanged joint 318, in one embodiment the containment enclosure structure (CES) 300 is entirely surrounded on all exposed above grade portions by the containment enclosure structure (CES) 300, which preferably is sufficiently tall to provide protection for the containment vessel against aircraft hazard or comparable projectile to preserve the structural integrity of the water mass in the annulus 313 surrounding the containment vessel. In one embodiment, as shown, the containment enclosure structure (CES) 300 extends vertically below grade to a substantial portion of the distance to the top of the base mat 304.

The containment enclosure structure (CES) 300 may further include at least one rain-protected vent 317 which is in fluid communication with the head space 318 beneath the dome 316 and water-filled annulus 313 to allow water vapor to flow, escape, and vent to atmosphere. In one embodiment, the vent 317 may be located at the center of the dome 316. In other embodiments, a plurality of vents may be provided spaced (substantially) radially around the dome 316. The vent 317 may be formed by a short section of piping in some embodiments which is covered by a rain hood of any suitable configuration that allows steam to escape from the containment enclosure structure (CES) but minimizes the ingress of water.

In some possible embodiments, the head space 318 between the dome 316 and top bead 206 of the containment vessel 200 may be filled with an energy absorbing material or structure to minimize the impact load on the containment enclosure structure (CES) dome 316 from a crashing (falling) projecting (e.g. airliner, etc.). In one example, a plurality of tightly-packed undulating or corrugated deformable aluminum plates may be disposed in part or all of the head space to form a crumple zone which will help absorb and dissipate the impact forces on the dome 316.

Referring primarily to FIGS. 1-5 and 8-17, the buried portions of the containment vessel 200 within the concrete foundation 301 below the base mat 304 may have a plain shell 204 without external features. Portions of the containment vessel shell 204 above the base mat 304, however, may include a plurality of longitudinal external (substantially) radial ribs or tins 220 which extend axially (substantially) parallel to vertical axis VA of the containment vessel-enclosure assembly 200-300. The external longitudinal fins 220 are spaced circumferentially around the perimeter of the containment vessel shell 204 and extend (substantially) radially outwards from the containment vessel.

The ribs 220 serve multiple advantageous functions including without limitation (1) to stiffen the containment vessel shell 204, (2) prevent excessive "sloshing" water reserve in annulus 313 in the occurrence of a seismic event, and (3) significantly to act as heat transfer "fins" to dissipate heat absorbed by conduction through the shell 204 to the environment of the annulus 313 in the situation of a fluid/steam release event in the containment vessel.

Accordingly, in one embodiment to maximize the heat transfer effectiveness, the longitudinal fins 220 extend vertically for substantially the entire height of the water-filled annulus 313 covering the effective heat transfer surfaces of the containment vessel 200 (i.e. portions not buried in concrete foundation) to transfer heat from the containment vessel 200 to the water reservoir, as further described herein. In one embodiment, the external longitudinal fins 220 have upper horizontal ends 220a which terminate at or proximate to the underside or bottom of the larger diameter top portion 216 of the containment vessel 200, and lower horizontal ends 220b which terminate at or proximate to the base mat 304 of the concrete foundation 301. In one embodiment, the external longitudinal fins 220 max have a height H3 which is equal to or greater than one half of a total height of the shell of the containment vessel.

In one embodiment, the upper horizontal ends 220a of the longitudinal fins 220 are free ends not permanently attached (e.g. welded) to the containment vessel 200 or other structure. At least part of the lower horizontal ends 220b oldie longitudinal tins 220 may abuttingly contact and rest on a horizontal circumferential rib 222 welded to the exterior surface of the containment vessel shell 204 to help support the weight of the longitudinal fins 220 and minimize stresses on the longitudinal rib-to-shell welds. Circumferential rib 222 is annular in shape and may extend a full 360 degrees completely around the circumferential of the containment vessel shell 204. In one embodiment, the circumferential rib 222 is located to rest on the base mat 304 of the concrete foundation 301 which transfers the loads of the longitudinal fins 220 to the foundation. The longitudinal fins 220 may have a lateral extent or width that projects outwards beyond the outer peripheral edge of the circumferential rib 222. Accordingly, in this embodiment, only the inner portions of the lower horizontal end 220b of each rib 220 contacts the circumferential rib 222. In other possible embodiments, the circumferential rib 222 may extend (substantially) radially outwards far enough so that substantially the entire lower horizontal end 220b of each longitudinal rib 220 rests on the circumferential rib 222. The lower horizontal ends 220b may be welded to the circumferential rib 222 in some embodiments to further strengthen and stiffen the longitudinal fins 220.

The external longitudinal fins 220 may be made of steel (e.g. low carbon steel), or other suitable metallic materials including alloys which are each welded on one of the longitudinally-extending sides to the exterior of the containment vessel shell 204. The opposing longitudinally-extending side of each rib 220 lies proximate to, but is preferably not permanently affixed to the interior of the inner shell 310 of the containment enclosure structure (CES) 300 to maximize the heat transfer surface of the ribs acting as heat dissipation fins. In one embodiment, the external longitudinal fins 220 extend (substantially) radially outwards beyond the larger diameter tap portion 216 of the containment vessel 200 as shown. In one representative example, without limitation, steel ribs 220 may have a thickness of about 1 inch. Other suitable thickness of ribs may be used as appropriate. Accordingly, in some embodiments, the ribs 220 have a radial width that is more than 10 times the thickness of the ribs.

Figure 2:
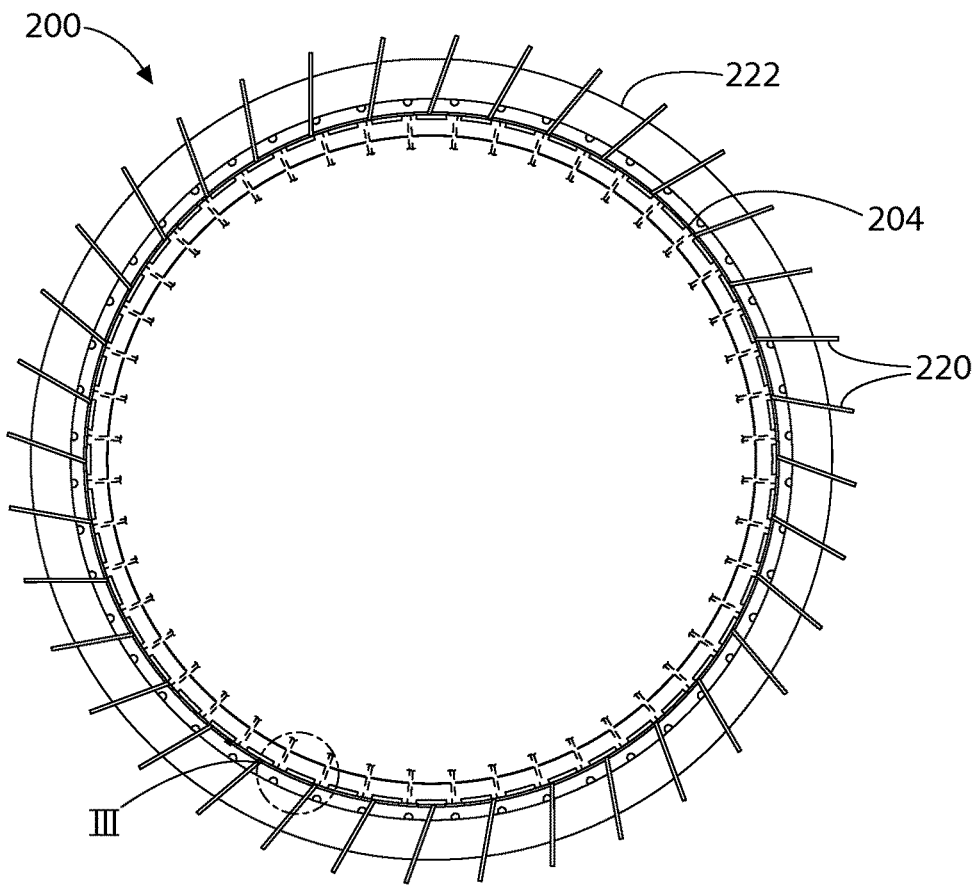
FIG. 2 is transverse cross-sectional view thereof taken along line II-II.
Figure 3:
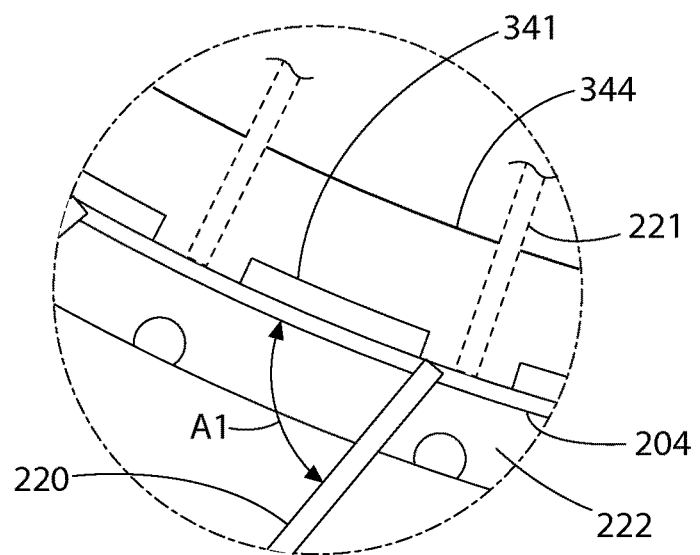
FIG. 3 is a detail of item III in FIG. 2.
Figure 5:
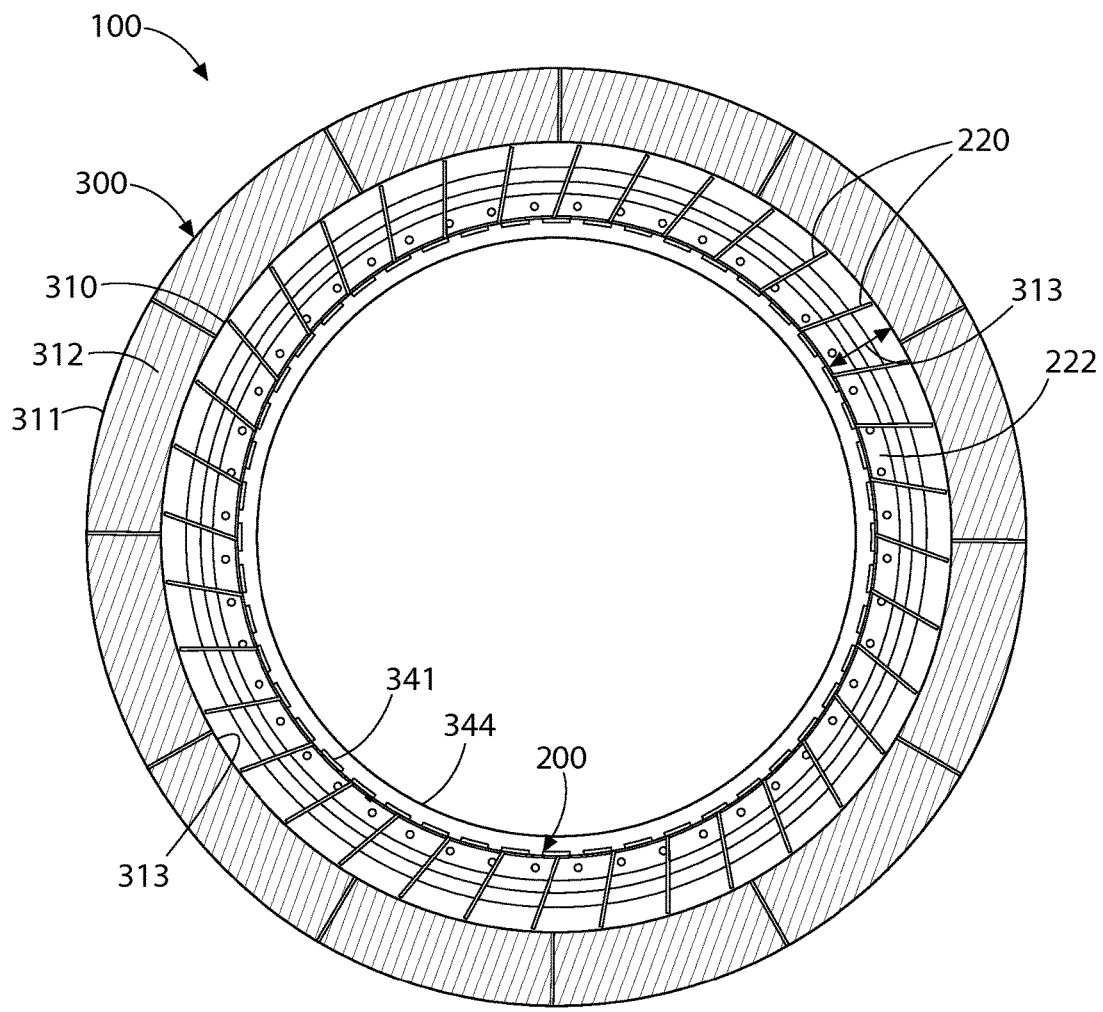
FIG. 5 is a longitudinal cross-sectional view through the containment vessel and containment enclosure structure (CES)

In one embodiment, the longitudinal fins 220 are oriented at an oblique angle A1 to containment vessel shell 204 as best shown in FIGS. 2-3 and 5. This orientation forms a crumple zone extending 360 degrees around the circumference of the containment vessel 200 to better resist projectile impacts functioning in cooperation with the outer containment enclosure structure (CES) 300. Accordingly, an impact causing inward deformation of the containment enclosure structure (CES) shells 210, 211 will bend the longitudinal fins 220 which in the process will distribute the impact forces preferably without direct transfer to and rupturing of the inner containment vessel shell 204 as might possibly occur with ribs oriented 90 degrees to the containment vessel shell 204. In other possible embodiments, depending on the construction of the containment enclosure structure (CES) 300 and other factors, a perpendicular arrangement of ribs 220 to the containment vessel shell 204 may be appropriate.

In one embodiment, referring to FIGS. 6-8, portions of the containment vessel shell 204 having and protected by the external (substantially) radial fins 220 against projectile impacts may extend below grade to provide protection against projectile strikes at or slightly below grade on the containment enclosure structure (CES) 300. Accordingly, the base mat 304 formed at the top of the vertically extending sidewalls 303 of the foundation 301 where the fins 220 terminate at their lower ends may be positioned a number of feet below grade to improve impact resistance of the nuclear reactor containment system.

In one embodiment, the containment vessel 200 may optionally include a plurality of circumferentially spaced apart internal (substantially) radial fins 221 attached to the interior surface of the shell 204 (shown as dashed in FIGS. 2 and 3). Internal fins 221 extend (substantially) radially inwards from containment vessel shell 204 and longitudinally in a vertical direction of a suitable height. In one embodiment, the internal (substantially) radial fins 221 may have a height substantially coextensive with the height of the water-filled annulus 313 and extend from the base mat 304 to approximately the top of the shell 204. In one embodiment, without limitation, the internal fins 221 may be oriented substantially perpendicular (i.e. 90 degrees) to the containment vessel shell 204. Other suitable angles and oblique orientations may be used. The internal fins function to both increase the available heat transfer surface area and structurally reinforce the containment vessel shell against external impact (e.g. projectiles) or internal pressure increase within the containment vessel 200 in the event of a containment pressurization event (e.g. LOCA or reactor scram), in one embodiment, without limitation, the internal fins 221 may be made of steel.

Referring to FIGS. 1-15, a plurality of vertical structural support columns 33 may be attached to the exterior surface of the containment vessel shell 204 to help support the diametrically larger top portion 216 of containment vessel 200 which has peripheral sides that are cantilevered (substantially) radially outwards beyond the shell 204. The support columns 331 are spaced circumferentially apart around the perimeter of containment vessel shell 204. In one embodiment, the support columns 331 may be formed of steel hollow structural members, for example without limitation C-shaped members in cross-section (i.e. structural channels), which are welded to the exterior surface of containment vessel shell 204. The two parallel legs of the channels may be vertically welded to the containment vessel shell 204 along the height of each support column 331 using either continuous or intermittent welds such as stitch welds.

The support columns 331 extend vertically downwards from and may be welded at their top ends to the bottom/underside of the larger diameter top portion 216 of containment vessel housing the polar crane. The bottom ends of the support columns 331 rest on or are welded to the circumferential rib 222 which engages the base mat 304 of the concrete foundation 30 near the buried portion of the containment. The columns 331 help transfer part of the dead load or weight from the crane and the top portion 216 of the containment vessel 300 down to the foundation. In one embodiment, the hollow space inside the support columns may be filled with concrete (with or without rebar) to help stiffen and further support the dead load or weight in other possible embodiments, other structural steel shapes including filled or unfilled box beams, I-beams, tubular, angles, etc. may be used. The longitudinal fins 220 may extend farther outwards in a (substantially) radial direction than the support columns 331 which serve a structural role rather than a heat transfer role as the ribs 220. In certain embodiments, the ribs 220 have a (substantially) radial width that is at least twice the (substantially) radial width of support columns.

FIGS. 11-15 show various cross sections (both longitudinal and transverse) of containment vessel 200 with equipment, shown therein. In one embodiment, the containment vessel 200 may be part of a small modular reactor (SMR) system such as SMR-160 by Holtec International. The equipment may generally include a nuclear reactor vessel 500 with a reactor core and circulating primary coolant disposed in a wet well 504, and a steam generator 502 fluidly coupled to the reactor and circulating a secondary coolant which may form part of a Rankine power generation cycle. Other appurtenances and equipment may be provided to create a complete steam generation system.

Referring primarily now to FIGS. 2-3, 16, and 18, the containment vessel 200 may further include an auxiliary heat dissipation system 340 including a plurality of internal longitudinal ducts 341 circumferentially spaced around the circumference of containment vessel shell 204. Ducts 341 extend vertically parallel to the vertical axis VA and in one embodiment are attached to the interior surface of shell 204. The ducts 341 may be made of metal such as steel and are welded, to interior of the shell 204. In one possible configuration, without limitation, the ducts 341 may be comprised of vertically oriented C-shaped structural channels (in cross section) positioned so that the parallel legs of the channels are each seam welded to the shell 204 for their entire height to define a sealed vertical flow conduit. Other suitably shaped and configured ducts may be provided so long the fluid conveyed in the ducts contacts at least a portion of the interior containment vessel shell 204 to transfer heat to the water-filled annulus 313.

Any suitable number and arrangement of ducts 341 may be provided depending on the heat transfer surface area required for cooling the fluid flowing through the ducts. The ducts 341 may be uniformly or non-uniformly spaced on the interior of the containment vessel shell 204, and in some embodiments grouped clusters of ducts may be circumferentially distributed around the containment vessel. The ducts 341 may have any suitable cross-sectional dimensions depending on the flow rate of fluid carried by the ducts and heat transfer considerations.

The open upper and lower ends 341a, 341b of the ducts 341 are each fluidly connected to a common upper inlet ring header 343 and lower outlet ring header 344. The annular shaped ring headers 343, 344 are vertically spaced apart and positioned at suitable elevations on the interior of the containment vessel 200 to maximize the transfer of heat between fluid flowing vertically inside ducts 341 and the shell 204 of the containment vessel in the active heat transfer zone defined by portions of the containment vessel having the external longitudinal fins 220 in the primary annulus 313. To take advantage of the primary water-filled annulus 313 for heat transfer, upper and lower ring headers 343, 344 may each respectively be located on the interior of the containment vessel shell 204 adjacent and near to the top and bottom of the annulus.

In one embodiment, the ring headers 343, 344 may each be formed of half-sections of steel pipe as shown which a welded directly to the interior surface of containment vessel shell 204 in the manner shown. In other embodiments, the ring headers 343, 344 may be formed of complete sections of arcuately curved piping supported by and attached to the interior of the shell 204 by any suitable means.

In one embodiment, the heat dissipation system 340 is fluidly connected to a source of steam that may be generated from a water mass inside the containment vessel 200 to reject radioactive material decay heat. The containment surface enclosed by the ducts 341 serves as the heat transfer surface to transmit the latent heat of the steam inside the ducts to the shell. 204 of the containment vessel 200 for cooling, via the external longitudinal tins 220 and water filled annulus 313. In operation, steam enters the inlet ring header 343 and is distributed to the open inlet ends of the ducts 341 penetrating the header. The steam enters the ducts 341 and flows downwards therein along the height of the containment vessel shell 204 interior and undergoes a phase change from steam to liquid. The condensed steam drains down by gravity in the ducts and is collected by the lower ring header 344 from which it is returned back to the source of steam also preferably by gravity in one embodiment. It should be noted that no pumps are involved or required in the foregoing process.

According, to another aspect of the present disclosure, a secondary or backup passive air cooling system 400 is provided to initiate air cooling by natural convection of the containment vessel 200 if, for some reason, the water inventory in the primary annulus 313 were to be depleted during, a thermal reactor related event (e.g. LOCA or reactor scram). Referring to FIG. 8, the air cooling system 400 may be comprised of a plurality of vertical inlet air conduits 401 spaced circumferentially around the containment vessel 200 in the primary annulus 313. Each air conduit 401 includes an inlet 402 which penetrates the sidewalls 320 of the containment enclosure structure (CES) 300 and is open to the atmosphere outside to draw in ambient cooling air. Inlets 402 are preferably positioned near the upper end of the containment enclosure structures sidewalls 320. The air conduits 401 extend vertically downwards inside the annulus 313 and terminate a short distance above the base mat 304 of the foundation (e.g. approximately 1 foot) to allow air to escape from the open bottom ends of the conduits.

Using the air conduits 401, a natural convection cooling airflow pathway is established in cooperation with the annulus 313. In the event the cooling water inventory in the primary annulus 313 is depleted by evaporation during a thermal event, air cooling automatically initiates by natural convection as the air inside the annulus will continue to be heated by the containment vessel 200. The heated air rises in the primary annulus 313, passes through the secondary annulus 330, enters the head space 318, and exits the dome 316 of the containment enclosure structure (CES) 300 through the vent 317 (see directional flow arrows, FIG. 8). The rising heated air creates a reduction in air pressure towards the bottom of the primary annulus 313 sufficient to draw in outside ambient downwards through the air conduits 401 thereby creating a natural air circulation pattern which continues to cool the heated containment vessel 200. Advantageously, this passive air cooling system and circulation may continue for an indefinite period of time to cool the containment vessel 200.

It should be noted that the primary annulus 313 acts as the ultimate heat sink for the heat generated inside the containment vessel 200. The water in this annular reservoir also acts to maintain the temperature of all crane vertical support columns 331 (described earlier) at essentially the same temperature thus ensuring the levelness of the crane rails (not shown) at all times which are mounted in the larger portion 216 of the containment vessel 200.

Figure 19:
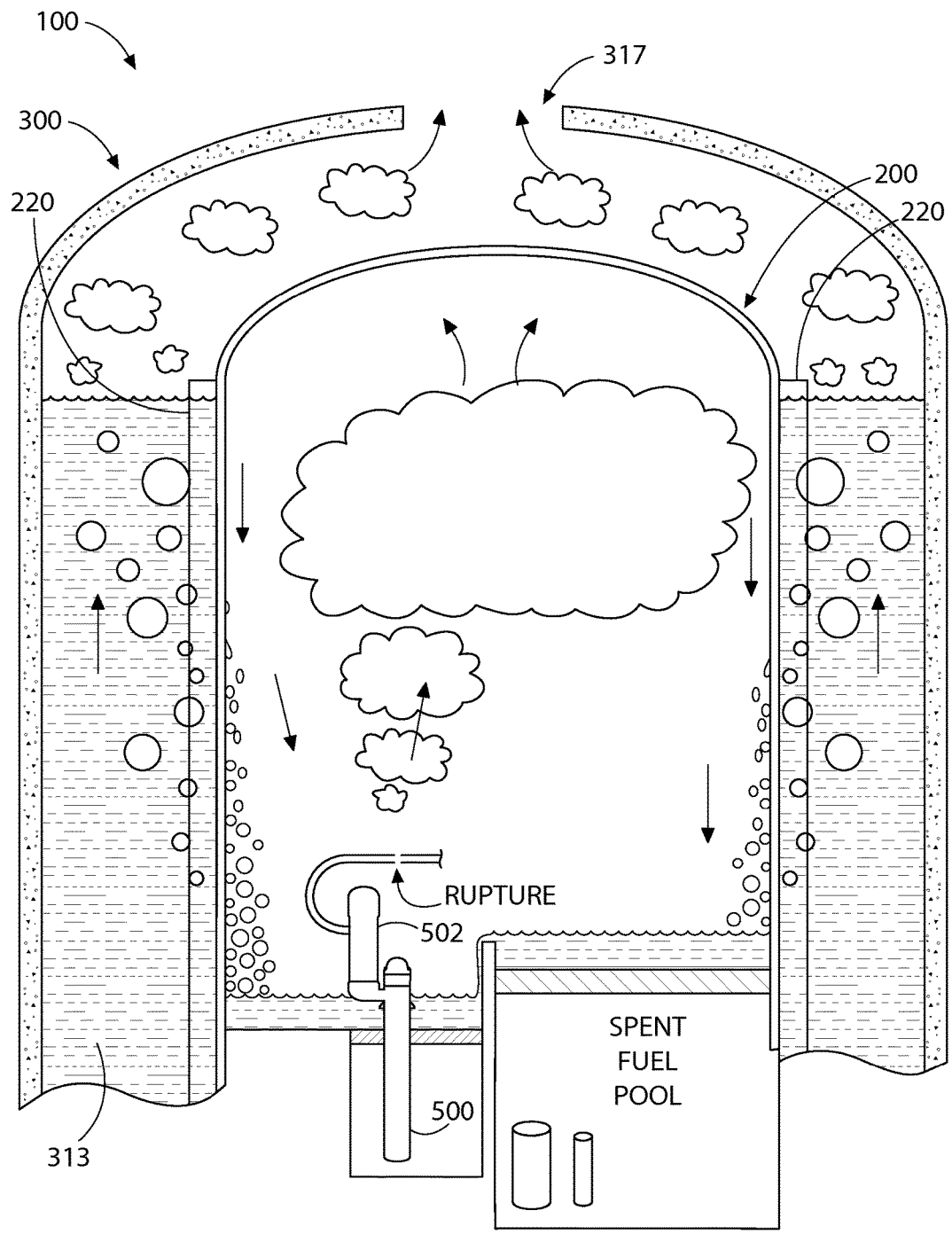
FIG. 19 is a schematic depiction of a generalized cross-section of the nuclear reactor containment system and operation of the water filled annular reservoir to dissipate heat and cool the containment vessel during a thermal energy release event.

Operation of the reactor containment system 100 as a heat exchanger will now be briefly described with initial reference to FIG. 19. This figure is a simplified diagrammatic representation of the reactor containment system 100 without all of the appurtenances and structures described herein for clarity in describing the active heat transfer and rejection processes performed by the system.

In the event of a loss-of-coolant (LOCA) accident, the high energy fluid or liquid coolant (which may typically be water) spills into the containment environment formed by the containment vessel 200. The liquid flashes instantaneously into steam and the vapor mixes with the air inside the containment and migrates to the inside surface of the containment vessel 200 sidewalls or shell 204 (since the shell of the containment is cooler due the water in the annulus 313). The vapor then condenses on the vertical shell walls by losing its latent heat to the containment structure metal which in turn rejects the heat to the water in the annulus 313 through the longitudinal fins 220 and exposed portions of the shell 204 inside the annulus. The water in the annulus 313 heats up and eventually evaporates forming a vapor which rises in the annulus and leaves the containment enclosure structure (CES) 300 through the secondary annulus 330, head space 318, and finally the vent 317 to atmosphere.

As the water reservoir in annulus 313 is located outside the containment vessel environment, in some embodiments the water inventory may be easily replenished using external means if available to compensate for the evaporative loss of water. However, if no replenishment water is provided or available, then the height of the water column in the annulus 313 will begin to drop. As the water level in the annulus 313 drops, the containment vessel 200 also starts to heat the air in the annulus above the water level, thereby rejecting a portion of the heat to the air which rises and is vented from the containment enclosure structure (CES) 300 through vent 317 with the water vapor. When the water level drops sufficiently such that the open bottom ends of the air conduits 401 (see, e.g. FIG. 8) become exposed above the water line, fresh outside ambient air will then be pulled in from the air conduits 401 as described above to initiate a natural convection air circulation pattern that continues cooling the containment vessel 200.

In one embodiment, provisions (e.g. water inlet line) are provided through the containment enclosure structure (CES) 300 for water replenishment in the annulus 313 although this is not required to insure adequate heat dissipation. The mass of water inventory in this annular reservoir is sized such that the decay heat produced in the containment vessel 200 has declined sufficiently such that the containment is capable of rejecting all its heat through air cooling alone once the water inventory is depleted. The containment vessel 200 preferably has sufficient heat rejection capability to limit the pressure and temperature of the vapor mix inside the containment vessel (within its design limits) by rejecting the thermal energy rapidly.

Figure 16:
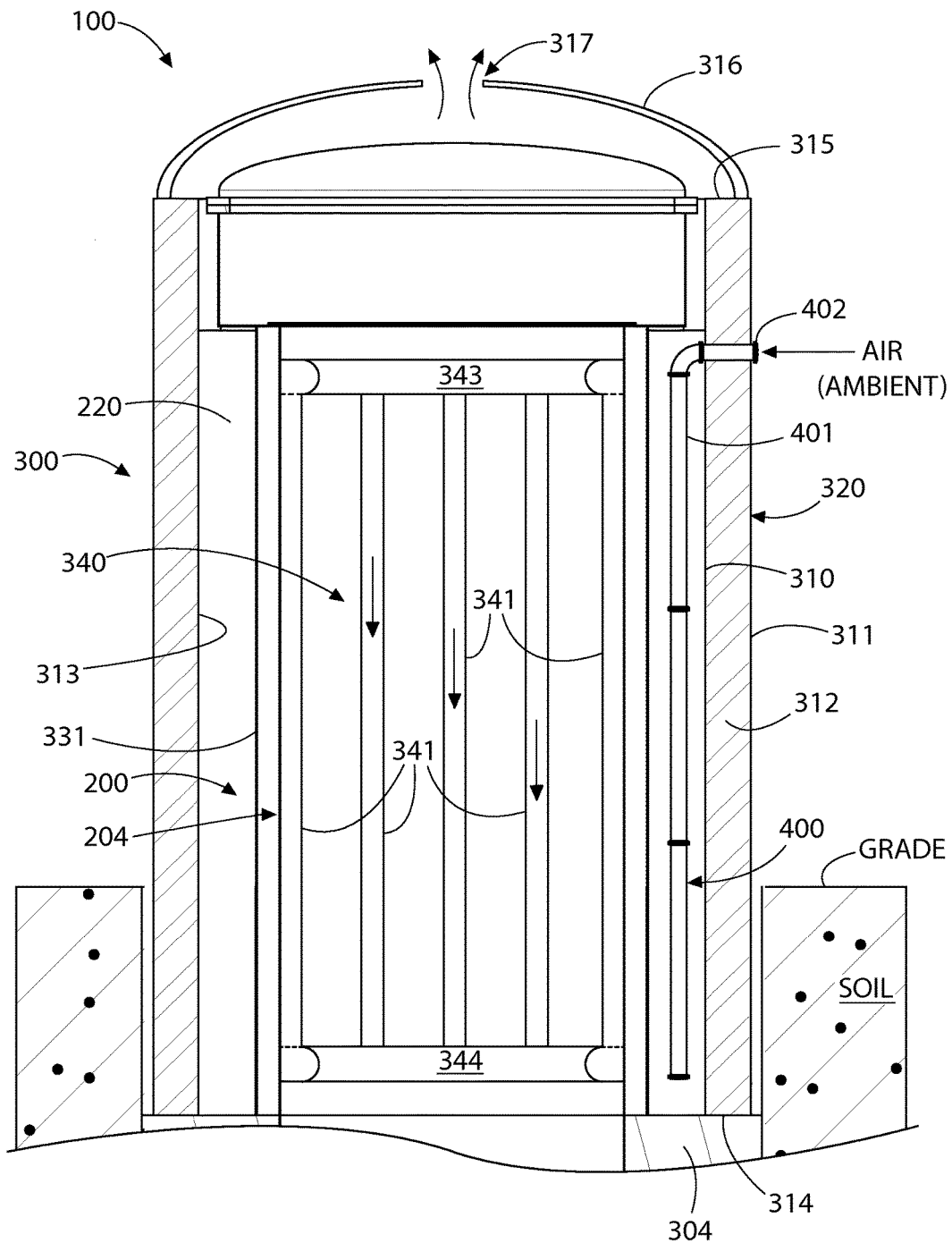
FIG. 16 is a partial longitudinal cross-sectional view of the nuclear reactor containment system showing an auxiliary heat dissipation system.
Figure 17:
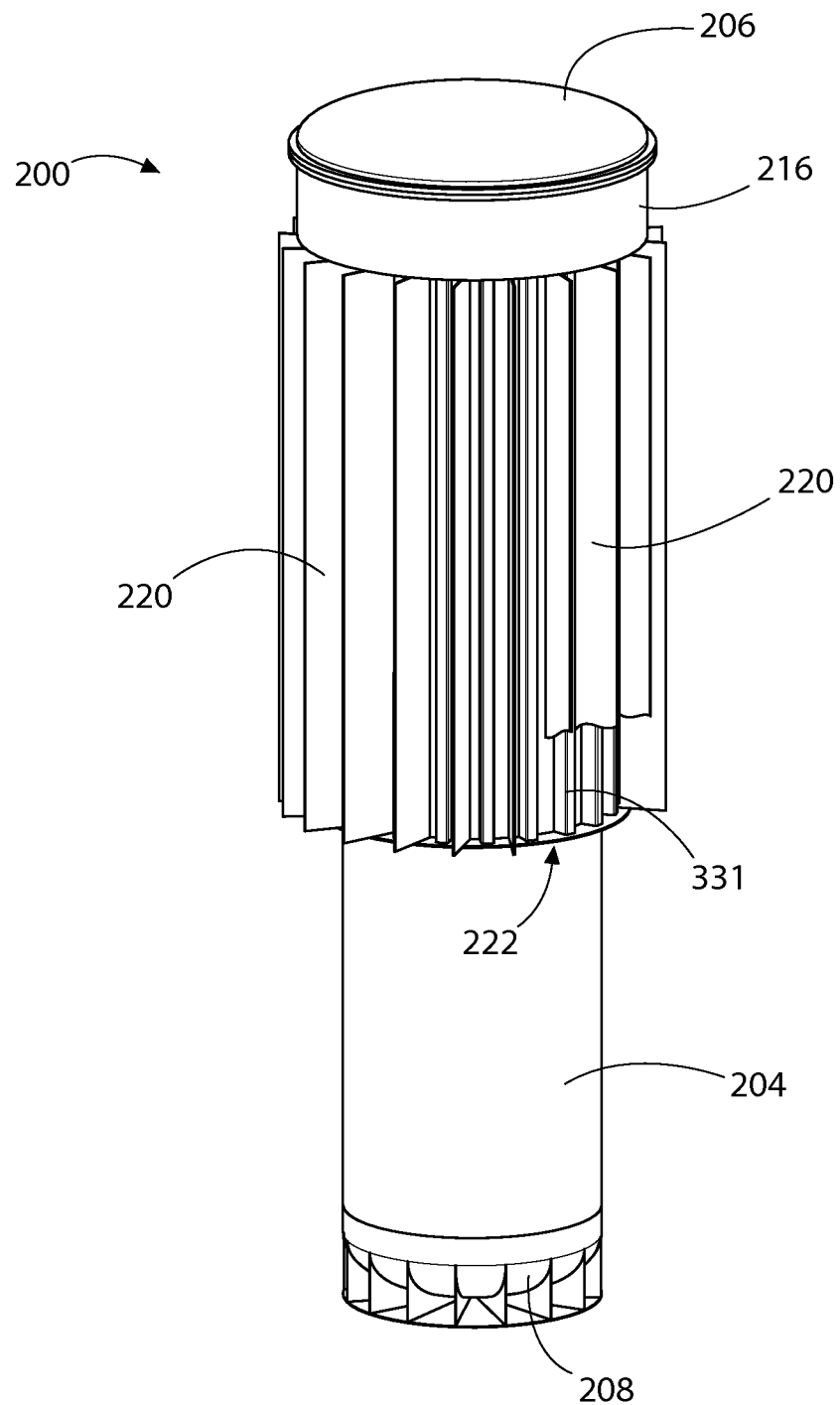
FIG. 17 is an isometric view of the containment vessel with tower portions of the (substantially) radial fins of the containment vessel broken away in part to reveal vertical support columns and circumferential rib.
Figure 18:
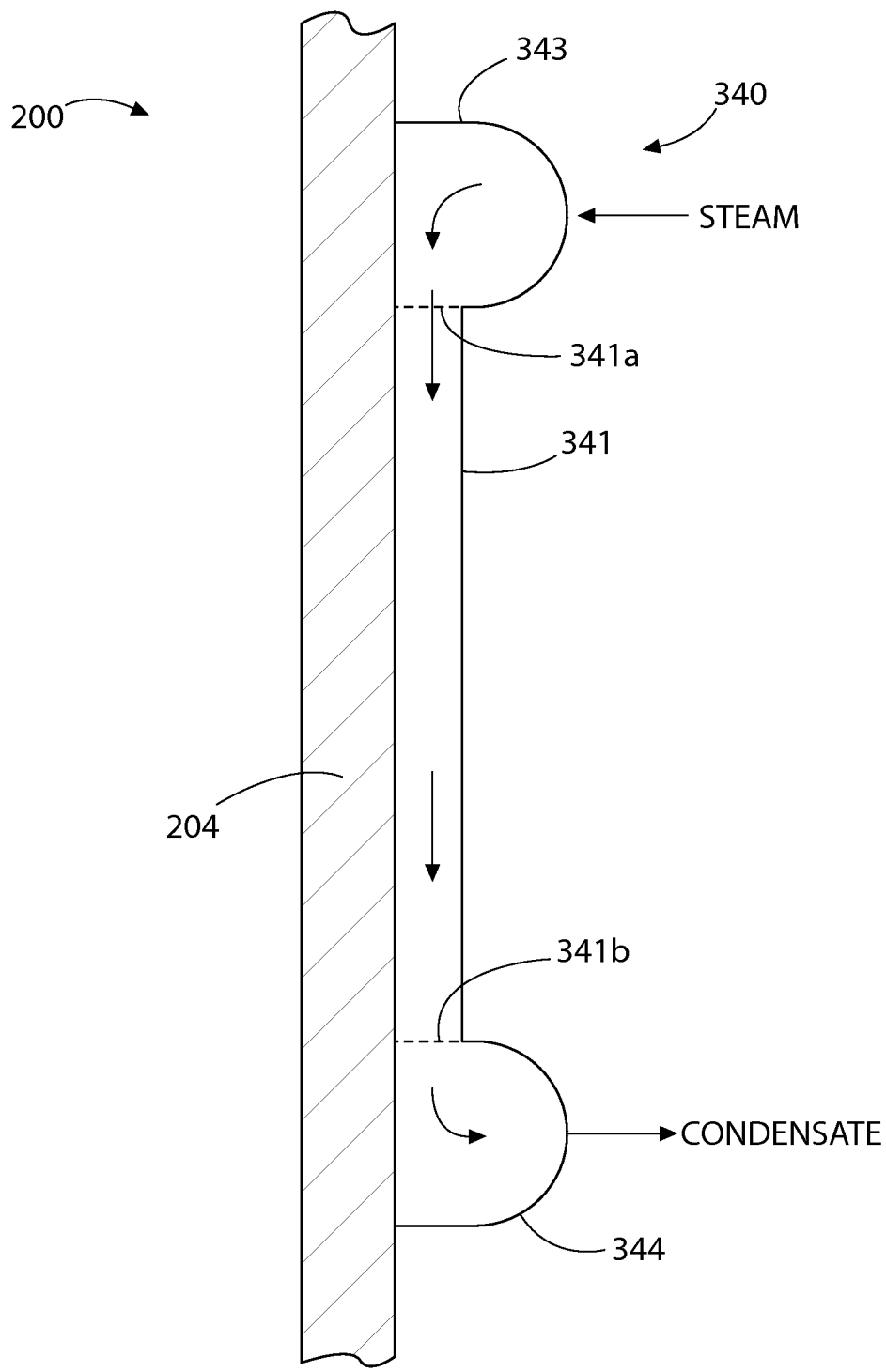
FIG. 18 is a longitudinal cross-sectional view of a portion of the heat dissipation system of FIG. 16 showing upper and lower ring headers and ducts attached to the shell of the containment vessel.

In the event of a station blackout, the reactor core is forced into a "scram" and the passive core cooling systems will reject the decay heat of the core in the form of steam directed upper inlet ring header 343 of heat dissipation system 340 already described herein (see, e.g. FIGS. 16 and 18). The steam then flowing downwards through the network of internal longitudinal ducts 341 comes in contact with the containment vessel shell 204 interior surface enclosed within the heat dissipation ducts and condenses by rejecting its latent heat to the containment structure metal, which in turn rejects the heat to the water in the annulus via heat transfer assistance provide by the longitudinal fins 220. The water in the annular reservoir (primary annulus 313) heats up eventually evaporating. The containment vessel 200 rejects the heat to the annulus by sensible heating and then by a combination of evaporation and air cooling, and then further eventually by natural convection air cooling only as described herein. As mentioned above, the reactor containment system 100 is designed and configured so that air cooling alone is sufficient to reject the decay heat once the effective water inventory in annulus 313 is entirely depleted.

In both these foregoing scenarios, the heat rejection can continue indefinitely until alternate means are available to bring the plant back online. Not only does the system operate indefinitely, but the operation is entirely passive without the use of any pumps or operator intervention.

Component Cooling Water System

According to another aspect of the present invention shown in FIGS. 20-25, an improved component cooling water (CCW) system 600 is provided. The component cooling water system 600 generally includes a heat exchanger 610 and one or more component cooling water pumps 601 which are fluidly connected via a substantially closed recirculating cooling water piping loop 636 as opposing to prior once-through cooling systems which may utilize raw water from a natural body of water for cooling. A majority of the cooling water piping loop 636 may be situated in the nuclear power generation plant external to the nuclear reactor containment vessel 200 and containment enclosure structure 300 surrounding the containment vessel (see e.g. FIG. 25). The cooling, water piping loop 636 collects and distributes heated and cooled cooling water from and to balance of plant equipment (represented by the CCW box in FIG. 25) fluidly connected to the piping loop and component cooling water system 600. The pumps 601 provide the motive force for driving the flow through the piping, loop 636 and heat exchanger 610. Pump 601 may be any suitable type of pump (e.g. centrifugal, etc.) having an appropriate suction and discharge head for the application conditions and desired flow rate. Any number or arrangement of pumps 601 may be provided to circulate cooling water through the piping loop 636.

In one embodiment according to the present disclosure, component cooling water system 600 advantageously utilizes the water in the water-filled annulus 313 (alternatively referred to herein as annular water reservoir 313) formed between the inner containment vessel 200 and outer containment enclosure structure 300 (previously described herein) as a functional heat transfer medium or sink for transferring heat to/from the annular water reservoir and component cooling water system 600. Accordingly, in this embodiment heat exchanger 610 may be physically located within and immersed/submerged in the annular water reservoir for direct transfer of heat to the reservoir. In general, the cooling water piping loop 636 recirculates component cooling water within a closed flow loop between the annular water reservoir 313 and plant equipment for cooling, as further described herein.

Figure 24:
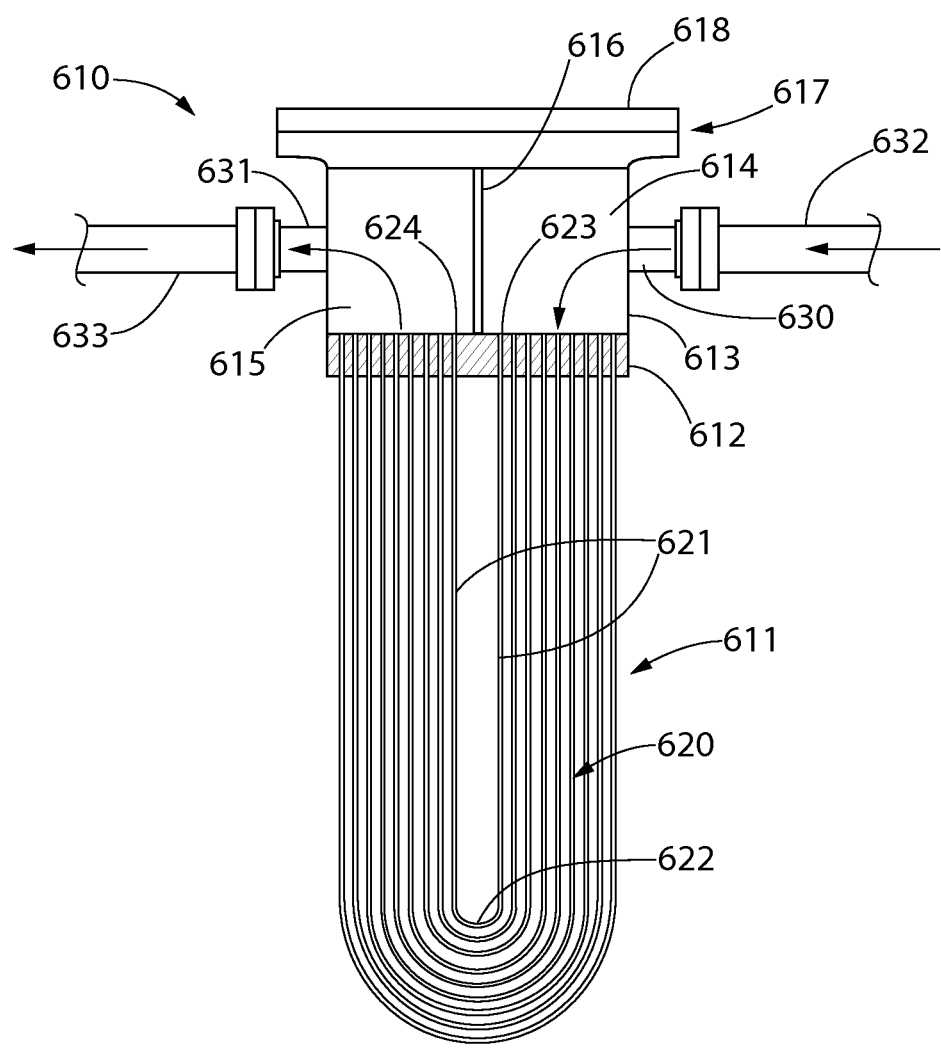
FIG. 24 is side cross-sectional elevation view of the heat exchanger of FIG. 20.

Referring initially to FIG. 24, heat exchanger 610 of the component cooling water system 600 in one non-limiting configuration is a shell-less heat exchanger including a vertically elongated and oriented channel-up U-tube bundle 611 comprising a plurality of U-shaped heat transfer tubes 620 attached at both ends to a tube sheet 612 formed adjacent channel 613. Channel 613 defines an interior space which may be divided into an inlet chamber 614 and outlet chamber 615 by a vertical partition plate 616. The bottom of inlet/outlet chambers 614, 615 are formed by an upper side of the tube sheet 612. The top of inlet/outlet chambers 614, 615 may be closed by a top cover 618 removably attached to the upper end of the channel 613.

Heat exchanger 610 includes an inlet nozzle 630 fluidly connected to inlet chamber 614 through a sidewall of channel 613 and an outlet nozzle 631 fluidly connected to outlet chamber 615 through a sidewall of the channel. The inlet and outlet nozzles 630, 631 are may be positioned in opposing relationship to each other on channel 613 in one embodiment; however, other suitable arrangements are possible. Inlet and outlet nozzles 630, 631 fluidly connect the heat exchanger 610 to the inlet cooling water piping 632 and outlet cooling water piping 633 of the component cooling water system 600. The inlet and outlet cooling water piping 632, 633 in turn are fluidly coupled to the closed cooling water piping loop 636 of the component cooling water system 600 (see also FIG. 25). In one embodiment, inlet and outlet nozzles 630, 631 may be flanged for coupling to mating flanges formed on the ends of the inlet and outlet cooling water piping 632, 633. The flanged joints 617 between the nozzles and piping may be bolted in one embodiment, or welded in other embodiments. It will be appreciated, however, that inlet and outlet cooling water piping 632, 633 may be directly welded to inlet and outlet nozzles 630, 631 without the use of flanges. Any suitable type of fluid connection type may be used.

Figure 22:
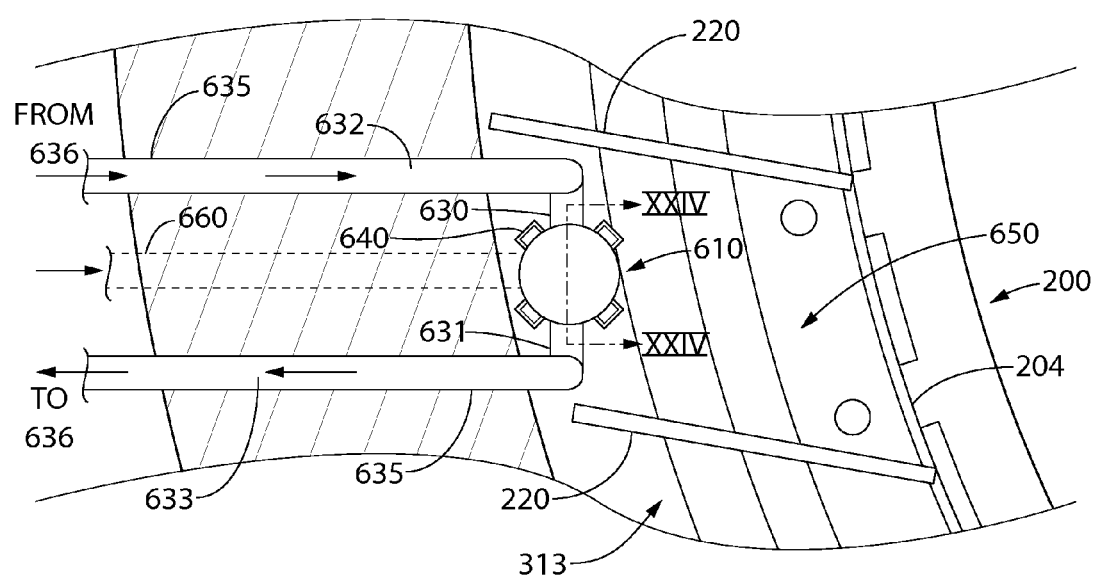
FIG. 22 is top plan view taken from a first elevation of the component cooling water system in FIG. 20.

Inlet and outlet cooling water piping 632, 633 may be arranged to extend through suitably configured penetrations 635 formed through outer containment enclosure structure 300 in some embodiments (see, e.g. FIG. 22). Penetrations 635 may be located at any suitable elevation to allow connection of the cooling water piping to inlet and outlet nozzles 630, 631 of heat exchanger 610. The piping may be any suitable metallic or non-metallic piping.

In one embodiment, a bolted flange joint 617 may be used to removably fasten the top cover 618 to channel 613. Other suitable approaches, however, may be used for attaching top cover 616 to channel 613. The top cover 618 provides a leak-proof enclosure of the channel 613 and may include suitable gaskets and/or seals to form a water-tight connection as will be well known to these skilled in the art. Preferably, partition plate 616 is configured and arranged to engage and form a seal with the tube sheet 612 and underside of top cover 618. This is intended to prevent or minimize leakage of cooling water between the inlet chamber 614 and outlet chamber 615 on opposing sides of the partition plate 616. In one possible arrangement, the partition plate 616 may have a linear bottom end or edge which may be fixedly welded to the upper side of tube sheet 612 and a linear top end or edge detachably engageable with the underside of top cover 618 via a suitable gasket and/or seal when the top cover is mounted on the channel 613. The removable top cover 618 provides access to the tube sheet 612 inside the channel for plugging leaking tubes, conducting non-destructive examination and inspection of the tube sheet and tubes, or for other purposes.

Referring generally to FIGS. 20-25, and particularly FIG. 24, the heat exchanger 610 in one exemplary embodiment may be shell-less heat exchanger wherein the U-shaped tubes 620 are not enclosed and exposed for direct immersion or submersion in the water-filled annulus 313 of the nuclear reactor containment system 100 formed between the inner containment vessel 200 and outer containment enclosure structure 300. Tubes 620 may each include two straight portions 621 and a U-shaped bend 622 disposed distal to and opposite the tube sheet 612. Each tube 620 has a first end 623 of a straight portion 621 connected through the tube sheet 612 to inlet chamber 614 and a second end 624 of a straight portion connected through the tube sheet to outlet chamber 615. In one embodiment, the end portions of the tubes 620 adjacent the tube ends may extend completely through vertical through holes formed in the tube sheet 612 from the underside to the top side of the tube sheet. The tubes may be secured to the tube sheet 612 via any suitable means, including without limitation welding, explosive expansion of the tube end portions to the tube sheet, or other methods known in the art.

The U-shaped tubes 620 may be bare or optionally include tins (e.g. axial or spiral) depending on the heat transfer rate requirements of the intended application and other technical considerations. Tubes 620 may be made of any suitable ferrous or non-ferrous metal or metal alloys such as, for example without limitation, aluminum or steel tubes attached to an aluminum clad or solid stainless steel tube sheet 612, respectively. Preferably, tubes 620 may be selected for corrosion resistance. Tubes 620 may have any suitable outside diameter and wall thickness.

Referring to FIGS. 20-25, heat exchanger 610 is shown installed in the water-filled annulus (annular water reservoir) 313 that girdles the inner containment vessel 200. The water inside the annular water reservoir may be kept in a non-quiescent state by recirculation pumps 663 of a reservoir recirculation system 662 (see FIG. 23) that that draw water from and returns it to the annulus 313 which agitates the water thereby preventing the growth of algae. These pumps may also serve to filter the reservoir water on an ongoing basis to maintain its cleanliness. The movement of water in the annular water reservoir 313 also helps promote evaporation, which helps any cooling function ascribed to it, such as removal of the Loss-of-Coolant Accident (LOCA) thermal energy as discussed elsewhere herein or removing heat from the cooling water of the component cooling water system via the heat exchanger 610 submerged in the water reservoir during normal operation of the reactor.

Figure 20:
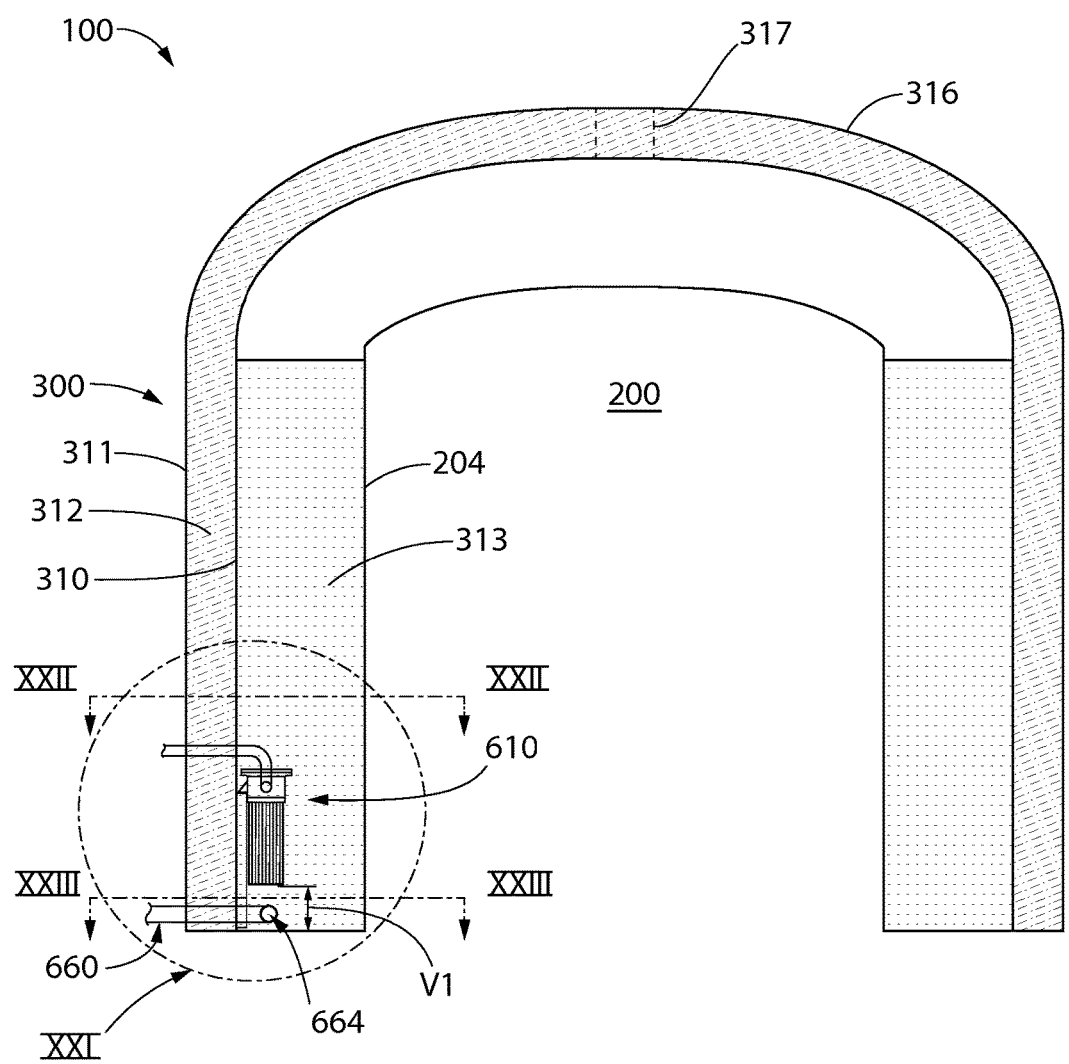
FIG. 20 is a schematic side cross-sectional view of a portion of a component cooling water system according to another aspect of the present disclosure.
Figure 21:
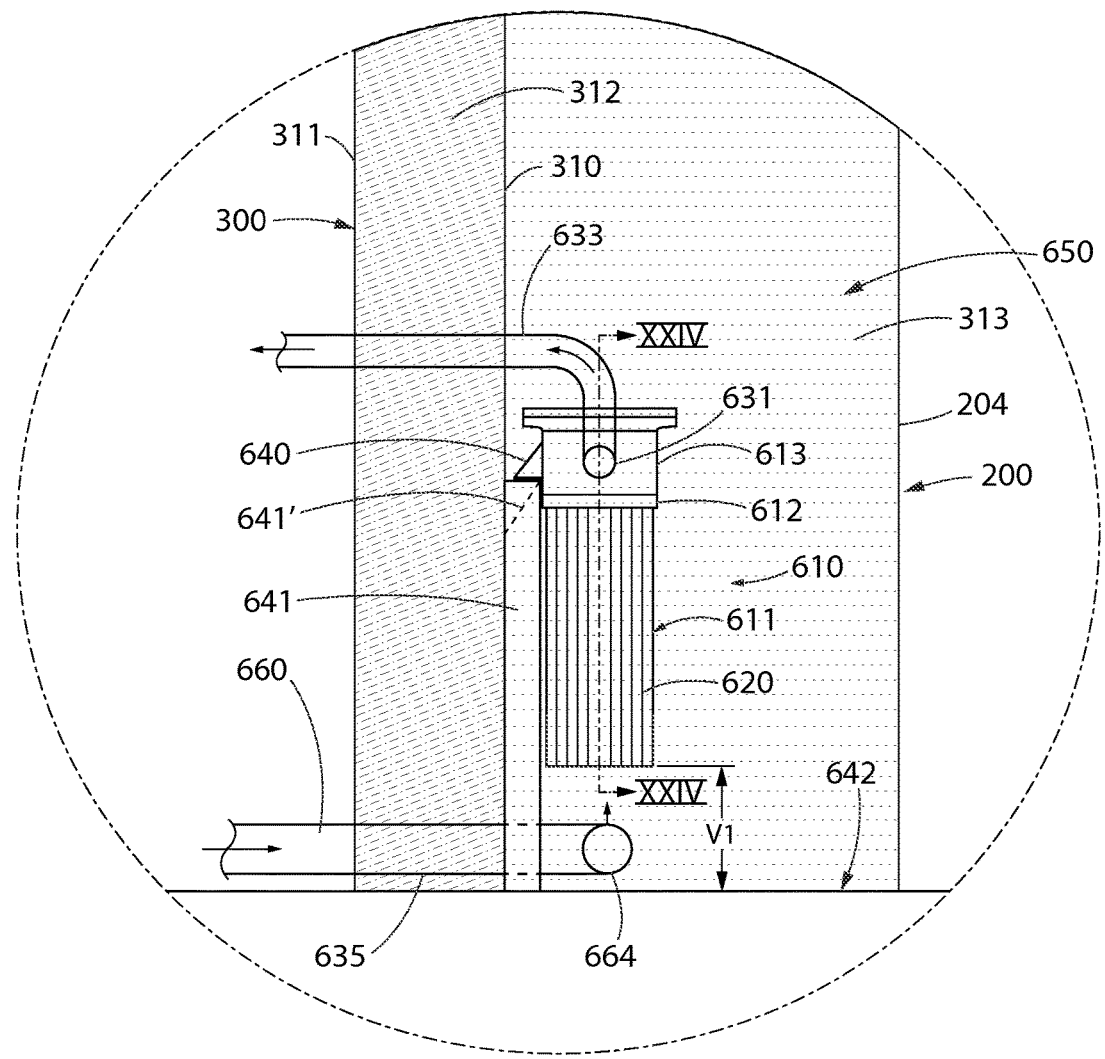
FIG. 21 is an enlarged detail taken from FIG. 20.

In one embodiment, heat exchanger 610 is suspended in water-filled annulus 313 (with appropriate seismic restraints) and positioned so that a bottom end of the tube bundle 611 (defined by the U-shaped bends 622) is spaced above the bottom 642 of the annular water reservoir by a vertical distance V1, as shown in FIGS. 20 and 21. In one non-limiting arrangement, the heat exchanger 610 includes one or more radially extending anchors or supports 640 preferably attached to channel 613 in a rigid manner to restrict movement of the channel when connected to a structural members (described below) inside the annular water reservoir. This arrangement restrains the channel 613, but advantageously allows the tube bundle 611 to freely grow and contract vertically in length in an unrestrained manner with respect to the channel 613 as the tubes 620 heat up or cool down depending on variations in temperature of the component cooling water flowing inside the tubes 620 during operation of the component cooling water system 600. In one exemplary embodiment, supports 640 may be formed of a horizontally oriented structural steel plate rein by a vertical gusset plate welded between the horizontal plate and side of channel 613. Numerous other variations and configurations of heat exchanger supports 640 are possible and may be used.

The supports 640 may be mounted to the containment vessel-enclosure assembly 200-300 inside the water-filled annular 313 in numerous ways. In one example, the supports 640 may be bolted or welded to corresponding structural stands 641 located inside the water-filled annulus 313 and attached to the containment vessel-enclosure assembly 200-300. In various embodiments, the stands 641 may be of the pedestal-type as shown rising from bottom 642 of the annular water reservoir, cantilevered from the interior surface of steel inner shell 310 of the outer containment enclosure structure 300 (see 641 in FIG. 21), or a combination thereof in some non-limiting examples. Numerous other variations of stands 641 may alternatively be provided. The stands 641 may be made of any suitable material or combination of materials, including steel, concrete, or other. The heat exchanger supports and stands preferably are designed and arranged to provide a seismically stable mounting of the heat exchanger 610 in the water-filled annular 313.

Referring to FIGS. 20-25, the heat exchanger 610 may be disposed and hung at a suitable location in one of the "bays" 650 formed in water-filled annulus 313 between a pair of adjacent spaced apart tins 220. In one arrangement, the heat exchanger 610 may be located near the bottom 642 of the annular water reservoir so that heat transfer may continue as long as possible in situations such as a scram event when the water level in the annular 313 may be dropping due to evaporation if makeup water to the reservoir is not readily available.

The bay 650 in which the heat exchanger 610 is mounted in one embodiment preferably may be the place where at least one recirculating pump 663 of the annular water reservoir recirculation piping system 662 (see, e.g. FIG. 23) delivers its flow through a well-placed discharge sparger 664 to agitate the water mass around the exposed tube bundle 611. This arrangement is intended to improve flow through and between the tubes to enhance heat transfer performance, as opposed to possible locations in other bays 650 in which flow conditions may be relatively more stagnant by comparison. The recirculation pump 663 draws water from the annular water reservoir 313 through outlet piping 661 fluidly coupled to the reservoir at a suitable location and discharges the water through inlet piping 660 fluidly coupled to the sparger 664 immersed/submerged in the reservoir. Inlet and outlet piping 660 and 661 may extend through suitable penetrations 635 formed through sidewalls of outer containment enclosure structure 300 in some embodiments; however, in other possible arrangements the inlet piping may introduce recirculated water into the sparger 664 from locations other than through the sidewall such as from the top of the annular water reservoir 313 (e.g. from piping running vertically downwards inside the annular water reservoir from the top). Outlet piping 661 may take suction from annular water reservoir 313 at any suitable location such as without limitation either in the same bay 650 containing sparger 664 or a different bay.

Recirculation pump 663 may be any suitable type of pump (e.g. centrifugal, etc.) having an appropriate suction and discharge head for the application conditions and desired flow rate. The piping may be an suitable metallic or non-metallic piping. More than one reservoir recirculation piping, systems 662 and/or sparger 664 may be provided in various embodiments.

Figure 23:
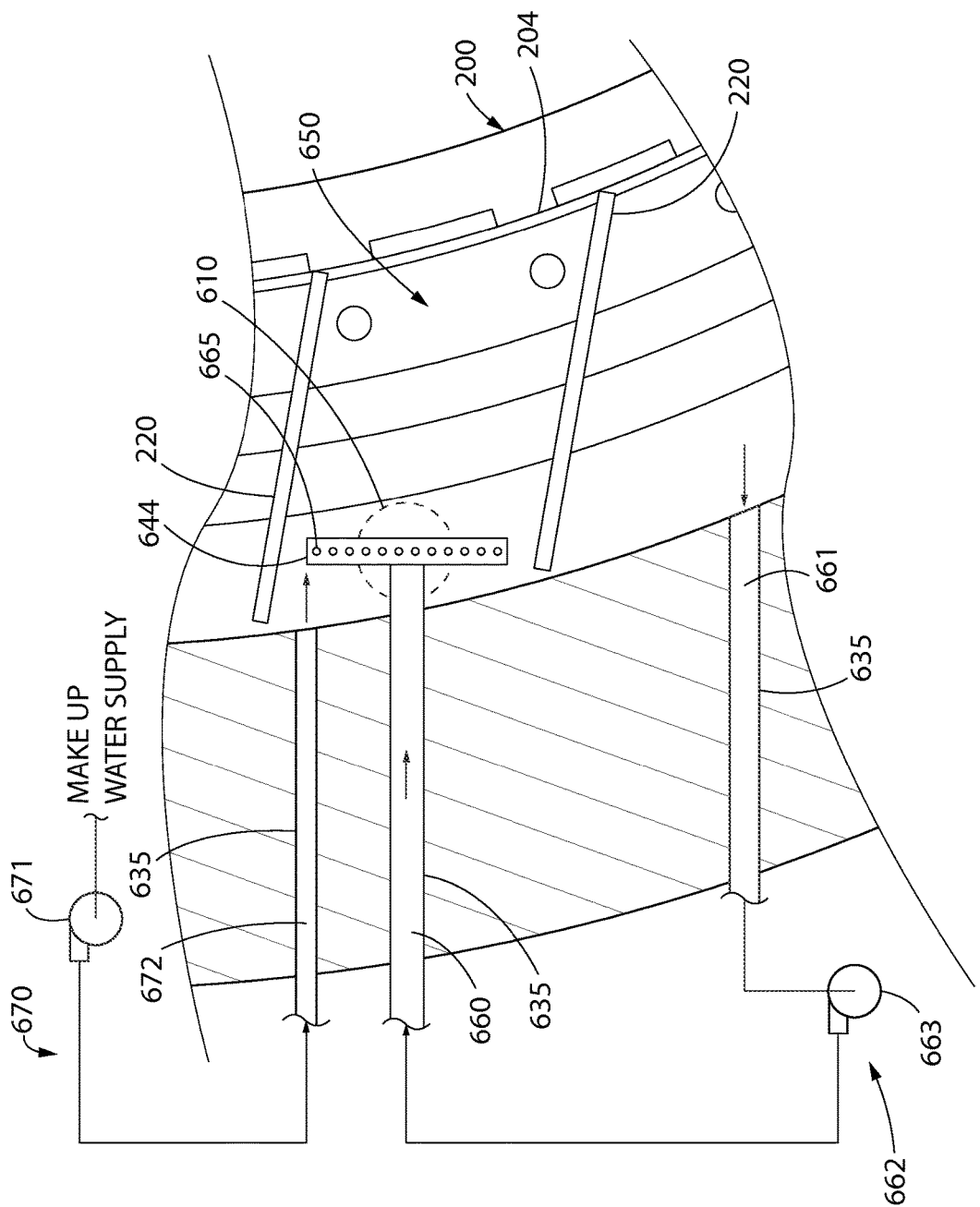
FIG. 23 is a second top plan view taken form a second elevation of the component cooling water system in FIG. 20, and also schematically showing an annular water reservoir recirculation and makeup water systems.

Referring to FIGS. 21 and 23, the sparger 664 may be formed of a generally horizontally oriented piping header in some embodiments having, a plurality of upward facing outlet holes 665 separated by any suitable spacing. In one preferred embodiment, the sparger 664 is located vertically beneath the heat exchanger tube bundle 611 and discharges recirculation water upwards at the tube bundle. Sparger 664 may be spaced at any suitable distance below the bottom of tube bundle 611. The sparger creates a localized upward flow of reservoir water in the area above and helps draws additional water from the reservoir into the recirculation upward flow pattern. Alternative sparger layouts are possible in accordance with the teachings discussed herein.

In some embodiments, bay 650 in which the heat exchanger 610 is mounted preferably may further be the place where "cold" makeup water is injected into the annular water reservoir 313 to replenish water lost through evaporation from the reservoir. The localized makeup water flow into the bay 650 in the proximity of the heat exchanger 610 enhances heat transfer performance and cooling of heated component cooling water. As shown in FIG. 23, a makeup water system 670 may include a makeup water pump 671 that takes suction from any suitable makeup water supply source external to the annular water reservoir 313 and discharges the makeup water through inlet piping 672 into the annular water reservoir. The inlet piping 672 may be located at any suitable position in bay 650 which does not interfere with the flow pattern produced by sparger 664, but close enough to the heat exchanger 610 to obtain the thermal heat transfer performance benefit of the generally cooler water in comparison to the water held in annular water reservoir 313. Inlet piping 672 may extend through a suitable penetration 635 formed through a sidewall of outer containment enclosure structure 300 in some embodiments; however, in other possible arrangements the inlet piping may introduce makeup water from locations other than through the sidewall such as from the top of the annular water reservoir 313 (e.g. from piping running vertically downwards inside the annular water reservoir from the top). Pump 671 may be any suitable type of pump (e.g. centrifugal, etc.) having an appropriate suction and discharge head for the application conditions and desired flow rate. The piping 672 may be any suitable metallic or non-metallic piping.

It will be appreciated that the term "cold" with reference to the makeup water is a comparative expression that generally refers to the fact that the makeup water is obtained from an external source other than the annular water reservoir, and preferably will have a temperature generally lower than water held in the annular water reservoir 313. The water in the annular water reservoir may typically have a temperature greater than ambient due to the operation of the nuclear reactor inside the reactor vessel which converts some of the water into water vapor which is vented to atmosphere from the reactor vessel, as described herein. Under certain plant operating conditions, it may be possible that the makeup water may have a temperature the same as or even higher than water in the annular water reservoir which is replacing. Accordingly, the term "cold" is used here for descriptive purposes to better describe the makeup water system and not as a term of limitation.

Figure 25:
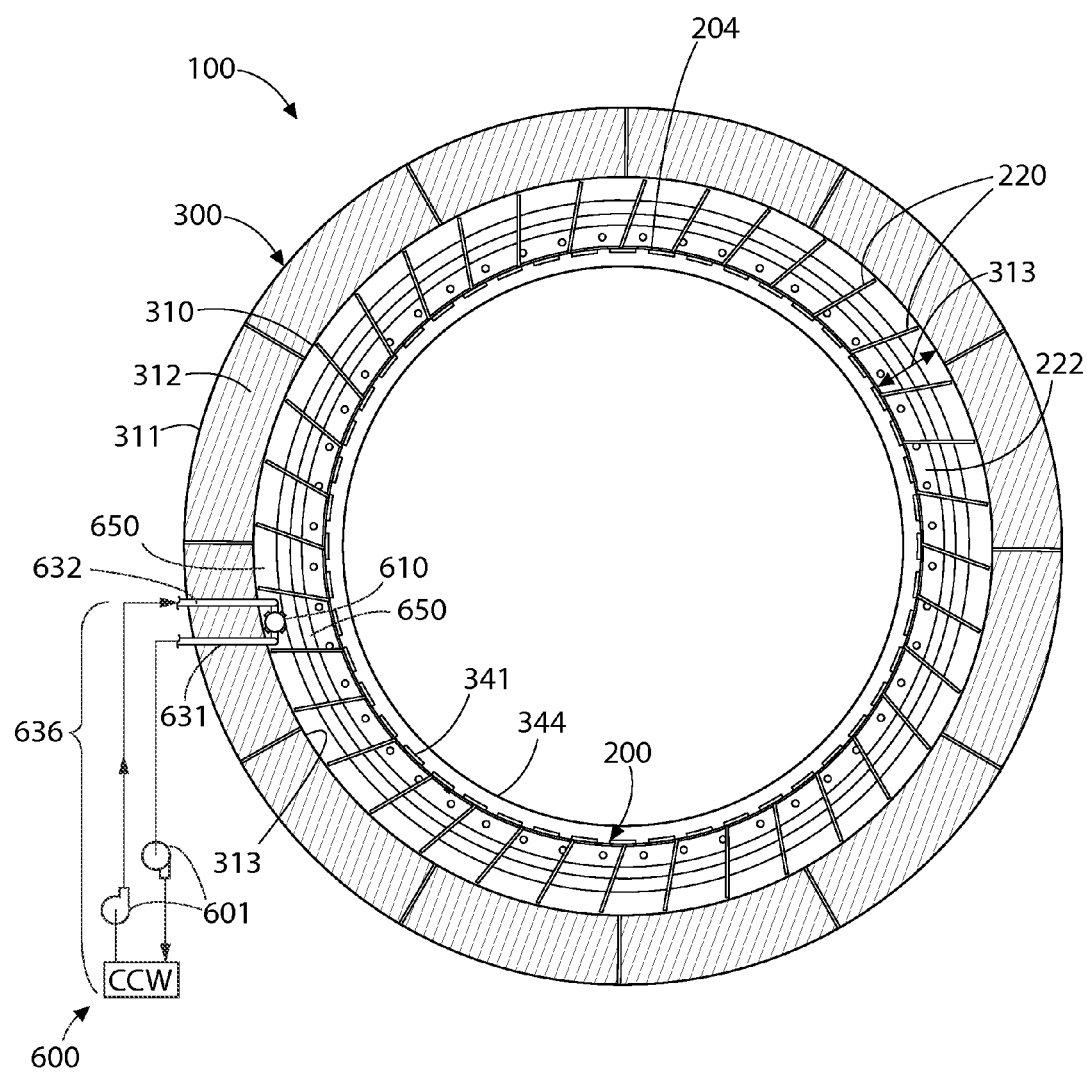
FIG. 25 is an overall top cross-sectional view of the nuclear reactor containment and component cooling water systems.

In normal operational mode of the reactor and component cooling water system 600, heated water received by component cooling water pump 601 from various plant equipment fluidly coupled to the component cooling water system is pumped through cooling water inlet piping 632 to heat exchanger 610 (reference FIGS. 22, 24, and 25). The heated cooling water flows through inlet nozzle 630 into inlet chamber 614 of heat exchanger 610. The heated cooling water then flows downward through the tube sheet 612 and tubes 620 of tube bundle 610, reverses direction via tube bends 622, and flows upward through the tubes into outlet chamber 615 in channel 613. The heated cooling water flowing inside the tubes 620 is cooled by transferring heat across the tube walls to the water held in the water-filled annulus 313 (annular water reservoir). The now cooled cooling water then flows from the outlet chamber 615 through outlet piping 635 connected to the heat exchanger 610 and is returned to the component cooling water system 600 for distribution to cool various plant equipment. The heat deposited into the annular water reservoir by the heat exchanger 610 is diffused into and heats the body of the reservoir water, and ultimately is dissipated to the environment by evaporation action from the reactor containment system 100 to the environment, as already described herein, in one embodiment, the heated water vapor from the annular water reservoir 313 may flow in a path through vent 317 in the dome 316 of the containment enclosure structure 300 to the environment.

The directional arrows shown in the figures represent the flow paths of the fluids discussed herein with respect to each figure. It will be appreciated by those skilled in the art that the fluid piping systems described herein may include the various auxiliary components and appurtenances such as valving, filters, pressure regulators, flow and pressure instructions, piping supports, etc. necessary to provide a fully functional system.

Heat exchanger 610 has been described with respect to an exemplary, but non-limiting shell-less heat exchanger having a U-tube bundle configuration which provides advantages such as a compact configuration, economical construction (materials and fabrication) due to only a single partitioned channel 613, and maximum exposure of the heat transfer tubes along, the vertical sides and bottom to the annular water reservoir 313 to optimize flow through the tube bundle. However, it will be appreciated that other tube configurations may be used having the tubes which are exposed to the water held in the annular water reservoir 313 (i.e., shell-less heat exchanger). Other possible configurations may include straight tube bundles connected at each tube end between spaced apart and opposed inlet and outlet channels. It will further be appreciated that other tube bundle orientations besides vertical may be used such as horizontal or angled between vertical and horizontal. Accordingly, the invention is not limited by the heat exchanger configuration or its orientation.

Advantages of the new invention include: long water intake lines that feed the component cooling heat exchanger in present day nuclear plants and are known to vulnerable to corrosion and degradation from the elements are eliminated, and the heat exchanger tube bundle is not subject to fouling of its heat transfer surfaces caused by prolonged contact with raw water that afflicts state of the art. I will be appreciated that in some embodiments, multiple heat exchangers 610 can be arrayed in parallel to increase the cooling capacity of the component cooling water system 600 as necessary. If multiple units are used, then maintenance work on any one unit can be performed while the reactor is on line.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein ma be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A component cooling water system for a nuclear power plant, the system comprising:
   a containment vessel defining containment space configured for housing a nuclear reactor;
   a containment enclosure structure surrounding the containment vessel;
   an annular water reservoir extending from the containment vessel to the containment enclosure structure, the annular water reservoir filled with water that directly wets the outer surfaces of the containment vessel and the inner surfaces of the containment enclosure structure, the annular water reservoir configured to provide a heat sink for dissipating thermal energy; and
   a shell-less heat exchanger having an exposed heat transfer tube bundle immersed in water held within the annular water reservoir;
   at least one component cooling water pump which is fluidly connected via a substantially closed recirculating cooling water piping loop to the heat exchanger within the annular reservoir, the pump circulating component cooling water within the closed recirculating cooling water piping loop through a tube side of the tube bundle;
   wherein component cooling water from the plant flows through the tube bundle and is cooled by transferring heat to the annular water reservoir.

2. The system of claim 1, wherein the tube bundle is comprised of a plurality of heat transfer tubes.

3. The system of claim 2, wherein the tube bundle is U-shaped.

4. The system of claim 3, wherein a bottom end of the tube bundle is spaced vertically apart from a bottom of the annular water reservoir.

5. The system of claim 1, wherein the tube bundle is vertically oriented.

6. The system of claim 5, wherein the tube bundle is connected to a tube sheet supported by a channel defining an inlet flow chamber and an outlet flow chamber each fluidly coupled to the tube bundle.

7. The system of claim 6, wherein:
   the channel is structurally supported and restrained inside the annular water reservoir via mounting to a surface within the annular reservoir, and the tube bundle is hung from the channel and unrestrained to grow and contract in length under thermal expansion.

8. The system of claim 1, wherein the component cooling water flows through a cooling water piping loop in the plant which is fluidly coupled to the heat exchanger for conveying the component cooling water to and from the heat exchanger.

9. The system of claim 8, wherein the cooling water piping loop recirculates heated and cooled component cooling water between the heat exchanger in the annular water reservoir and equipment in the plant.

10. The system of claim 9, further comprising at least one pump fluidly coupled to the cooling water piping loop for driving component cooling water through the cooling water piping loop.

11. The system of claim 8, wherein the cooling water piping loop is fluidly coupled to a channel formed on the heat exchanger defining an inlet flow chamber and an outlet flow.

12. The system of claim 11, wherein tubes of the tube bundle each have one end fluidly coupled to the inlet flow chamber and a second end fluidly coupled to the outlet flow chamber.

13. The system of claim 12, further comprising a partition plate disposed in the channel which divides the channel into the inlet and outlet flow chambers.

14. The system of claim 1, further comprising a discharge sparger positioned below the exposed tube bundle in the annular water reservoir, the sparger configured and arranged to discharge water through the tube bundle for cooling.

15. The system of claim 14, wherein the sparger forms part of a pumped recirculation system fluidly coupled to the annular water reservoir, the recirculation system configured and operable to extract water from the annular water reservoir and return water to the annular water reservoir through the sparger.

16. The system of claim 14, wherein the heat exchanger is positioned in a location within the annular water reservoir which is in proximity to an inlet from a reservoir makeup water supply system that discharges water into the annular water reservoir thereby replacing water lost by evaporation.

17. The system of claim 16, wherein the inlet from the reservoir makeup water supply system and sparger are located in the same bay.

18. The system of claim 1, further comprising a plurality of substantially radial fins protruding outwards from the containment vessel and located in the annular water reservoir, wherein the heat exchanger is located in a bay formed in the annular water reservoir between spaced apart adjacent fins.

19. The system of claim 18, wherein the fins are obliquely oriented to the containment vessel.

20. A component cooling water system for a nuclear power plant, the system comprising:
   a containment vessel defining containment space configured for housing a nuclear reactor;
   a containment enclosure structure surrounding the containment vessel;
   an annular water reservoir extending from formed between the containment vessel and to the containment enclosure structure, the annular water reservoir filled with water that directly wets the outer surfaces of the containment vessel and the inner surfaces of the containment enclosure structure, the annular water reservoir configured to provide a heat sink for dissipating thermal energy;
   a shell-less heat exchanger having an exposed heat transfer tube bundle comprised of a plurality of tubes immersed in water held within the annular water reservoir;
   at least one component cooling water pump which is fluidly connected via a substantially closed recirculating cooling water piping loop to the heat exchanger within the annular reservoir, the pump circulating component cooling water within the closed recirculating cooling water piping loop through a tube side of the tube bundle;
   a discharge sparger positioned below the exposed tube bundle in the annular water reservoir, the sparger configured and arranged to discharge water recirculated from the annular water reservoir through the tube bundle for cooling the tubes;
   wherein component cooling water from the plant flows through the tubes of the tube bundle and is cooled by transferring heat to the annular water reservoir.

21. The system of claim 20, wherein the sparger forms part of a pumped recirculation system fluidly coupled to the annular water reservoir, the recirculation system configured and operable to extract water from the annular water reservoir and return water to the annular water reservoir through the sparger.

22. The system of claim 20, further comprising a plurality of substantially radial fins protruding outwards from the containment vessel towards the containment enclosure structure and located in the annular water reservoir, wherein the heat exchanger and sparger are located in a bay formed in the annular water reservoir between spaced apart adjacent fins.

23. The system of claim 20, wherein the component cooling water flows through a pumped cooling water piping loop in the plant which is fluidly coupled to the heat exchanger for conveying the component cooling water to and from the heat exchanger.

24. A component cooling water system for a nuclear power plant, the system comprising:
   a containment vessel defining containment space housing a nuclear reactor;
   a containment enclosure structure surrounding the containment vessel;
   an annular water reservoir extending from the containment vessel to the containment enclosure structure, the annular water reservoir filled with water that directly wets the outer surfaces of the containment vessel and the inner surfaces of the containment enclosure structure, the annular water reservoir configured to provide a heat sink for dissipating thermal energy;
   a shell-less heat exchanger having an exposed heat transfer tube bundle comprised of a plurality of tubes immersed in water held within the annular water reservoir;
   at least one component cooling water pump which is fluidly connected via a substantially closed recirculating cooling water piping loop to the heat exchanger within the annular reservoir, the pump circulating component cooling water within the closed recirculating cooling water piping loop through a tube side of the tube bundle;
   a plurality of substantially radial metal fins protruding outwards from the containment vessel towards the containment enclosure structure and located in the annular water reservoir, the heat exchanger being located in a circumferentially-extending bay formed in the annular water reservoir between a pair of spaced apart adjacent fins;
   wherein component cooling water from the plant flows through the tubes of the tube bundle and is cooled by transferring heat to the annular water reservoir.

25. The system of claim 24, further comprising:
   a pumped reservoir recirculation piping system having a discharge sparger positioned in the bay below the exposed tube bundle in the annular water reservoir,
   wherein the recirculation piping system is configured and operable to extract water from the annular water reservoir and pump the extracted water through the discharge sparger into the tube bundle for cooling the tubes.

26. The system of claim 24, further comprising a piping system that discharges reservoir makeup water into the bay holding the heat exchanger thereby replacing water lost by evaporation.

* * * * *